United States Patent
Ataei et al.

(10) Patent No.: US 12,461,422 B2
(45) Date of Patent: Nov. 4, 2025

(54) SYSTEM, METHOD, AND APPARATUS TO STEER AN ELECTROMAGNETIC BEAM UTILIZING STAGED STEERING

(71) Applicant: Exciting Technology, LLC, Dayton, OH (US)

(72) Inventors: Abtin Ataei, Oakwood, OH (US); Paul F. McManamon, Dayton, OH (US)

(73) Assignee: Exciting Technology LLC, Dayton, OH (US)

( * ) Notice: Subject to any disclaimer, the term of this patent is extended or adjusted under 35 U.S.C. 154(b) by 122 days.

(21) Appl. No.: 17/836,710

(22) Filed: Jun. 9, 2022

(65) Prior Publication Data

US 2022/0326589 A1 Oct. 13, 2022

Related U.S. Application Data

(63) Continuation of application No. PCT/US2020/064071, filed on Dec. 9, 2020, which is a continuation-in-part of application No. 16/999,815, filed on Aug. 21, 2020, now Pat. No. 11,835,841, and a continuation-in-part of application No. 16/916,731, filed on Jun. 30, 2020, now Pat. No. 10,989,982, which is a continuation of application No. PCT/US2019/057616, filed on Oct. 23, 2019, which is a continuation-in-part of application No. PCT/US2019/023915, filed on Mar. 25, 2019, said application No. 16/999,815 is a continuation of application No. PCT/US2019/023915, filed on Mar. 25, 2019, which is a continuation-in-part of (Continued)

(51) Int. Cl.
*G02F 1/03* (2006.01)
*G02F 1/07* (2006.01)
*G02F 1/29* (2006.01)

(52) U.S. Cl.
CPC .................................. *G02F 1/292* (2013.01)

(58) Field of Classification Search
CPC .... G02B 26/08; G02F 2203/24; G03H 1/0248
USPC .......................... 359/15, 245, 279, 315, 316
See application file for complete search history.

(56) References Cited

U.S. PATENT DOCUMENTS

| | | |
|---|---|---|
| 4,243,300 A | 1/1981 | Richards et al. |
| 5,223,971 A | 6/1993 | Magel |

(Continued)

FOREIGN PATENT DOCUMENTS

| | | |
|---|---|---|
| EP | 0903608 A2 | 3/1999 |
| WO | 2015171125 A1 | 11/2015 |

(Continued)

OTHER PUBLICATIONS

"Surface", school.eb.com/levels/high/article/surface/473422, 2020, 1.

(Continued)

*Primary Examiner* — Mahidere S Sahle
(74) *Attorney, Agent, or Firm* — GTC Law Group PC & Affiliates

(57) ABSTRACT

An example system for steering an electromagnetic (EM) beam includes a first continuous steering layer configured to steer an incident beam from an EM source to a first selected angle, and incident on a second continuous steering layer, and the second continuous steering layer configured to further steer the incident beam to a target steering angle value.

9 Claims, 10 Drawing Sheets

Related U.S. Application Data application No. 15/796,055, filed on Oct. 27, 2017, now Pat. No. 10,845,671.

(60) Provisional application No. 62/945,720, filed on Dec. 9, 2019, provisional application No. 62/868,286, filed on Jun. 28, 2019, provisional application No. 62/749,487, filed on Oct. 23, 2018.

(56) References Cited

U.S. PATENT DOCUMENTS

| | | |
|---|---|---|
| 5,943,159 A | 8/1999 | Zhu |
| 5,987,041 A | 11/1999 | Taniguchi et al. |
| 6,169,594 B1 | 1/2001 | Aye et al. |
| 6,172,792 B1 | 1/2001 | Jepsen et al. |
| 6,317,251 B1 | 11/2001 | Wang |
| 6,373,620 B1 | 4/2002 | Wang |
| 6,400,855 B1 | 6/2002 | Li et al. |
| 6,456,419 B1 | 9/2002 | Winker et al. |
| 6,556,260 B1 | 4/2003 | Itou et al. |
| 6,746,618 B2 | 6/2004 | Li et al. |
| 7,057,787 B2 | 6/2006 | Cicchiello et al. |
| 7,411,724 B2 | 8/2008 | Cicchiello et al. |
| 8,014,050 B2 | 9/2011 | McGrew |
| 8,614,743 B2 | 12/2013 | Winsor |
| 8,654,292 B2 | 2/2014 | Kubota et al. |
| 8,674,792 B2 | 3/2014 | Yonak et al. |
| 8,699,137 B2 | 4/2014 | McGrew |
| 8,717,659 B2 | 5/2014 | Zheludev et al. |
| 9,164,206 B2 | 10/2015 | Valley et al. |
| 9,369,106 B2 | 6/2016 | Yonak et al. |
| 9,594,262 B2 | 3/2017 | Zheludev et al. |
| 9,709,829 B2 | 7/2017 | McGrew |
| 10,386,489 B2 | 8/2019 | Albelo et al. |
| 10,845,671 B2 | 11/2020 | McManamon et al. |
| 10,989,982 B2 | 4/2021 | Ataei et al. |
| 11,169,425 B2 | 11/2021 | Ataei et al. |
| 11,561,451 B2 | 1/2023 | Ataei et al. |
| 11,835,837 B2 | 12/2023 | McManamon et al. |
| 11,835,838 B2 | 12/2023 | McManamon et al. |
| 11,835,841 B2 | 12/2023 | McManamon et al. |
| 12,055,836 B2 | 8/2024 | McManamon et al. |
| 2003/0021519 A1 | 1/2003 | Zalevsky et al. |
| 2004/0067013 A1 | 4/2004 | Gu et al. |
| 2004/0135965 A1 | 7/2004 | Holmes |
| 2004/0264229 A1 | 12/2004 | Tsu |
| 2005/0265403 A1 | 12/2005 | Anderson et al. |
| 2006/0092499 A1 | 5/2006 | Cicchiello et al. |
| 2006/0119928 A1 | 6/2006 | Cicchiello et al. |
| 2007/0146910 A1 | 6/2007 | Duston et al. |
| 2007/0166625 A1 | 7/2007 | Cole et al. |
| 2007/0279365 A1 | 12/2007 | Kageyama |
| 2008/0015553 A1 | 1/2008 | Zacharias |
| 2008/0212007 A1 | 9/2008 | Meredith |
| 2008/0239420 A1 | 10/2008 | McGrew |
| 2008/0247031 A1 | 10/2008 | Wasilousky |
| 2009/0073411 A1 | 3/2009 | Tanitsu |
| 2009/0206963 A1 | 8/2009 | Nguyen et al. |
| 2009/0304328 A1 | 12/2009 | Presley et al. |
| 2010/0301971 A1 | 12/2010 | Yonak et al. |
| 2011/0286063 A1 | 11/2011 | McGrew |
| 2012/0327502 A1 | 12/2012 | Zheludev et al. |
| 2013/0128334 A1 | 5/2013 | Stephen |
| 2013/0307644 A1 | 11/2013 | Yonak et al. |
| 2014/0016051 A1 | 1/2014 | Kroll et al. |
| 2015/0049377 A1 | 2/2015 | Zheludev et al. |
| 2015/0293409 A1 | 10/2015 | Usukura et al. |
| 2015/0301427 A1 | 10/2015 | Galstian et al. |
| 2015/0346495 A1 | 12/2015 | Welch et al. |
| 2015/0346521 A1 | 12/2015 | Williams |
| 2015/0378241 A1 | 12/2015 | Eldada |
| 2017/0059960 A1 | 3/2017 | Shi et al. |
| 2017/0269453 A1 | 9/2017 | Galstian et al. |
| 2018/0038576 A1 | 2/2018 | Mao |
| 2018/0101083 A1 | 4/2018 | Aflatouni et al. |
| 2018/0136538 A1 | 5/2018 | Khan |
| 2018/0180256 A1 | 6/2018 | Mao et al. |
| 2018/0275394 A1 | 9/2018 | Yeoh et al. |
| 2018/0364463 A1 | 12/2018 | Yuan et al. |
| 2019/0129275 A1 | 5/2019 | McManamon et al. |
| 2019/0187482 A1 | 6/2019 | Lanman |
| 2019/0285902 A1 | 9/2019 | Ouderkirk et al. |
| 2020/0124864 A1 | 4/2020 | Rothberg et al. |
| 2020/0183016 A1 | 6/2020 | Wang et al. |
| 2020/0326606 A1 | 10/2020 | Ataei et al. |
| 2020/0333679 A1 | 10/2020 | Ataei et al. |
| 2020/0333680 A1 | 10/2020 | Ataei et al. |
| 2020/0333682 A1 | 10/2020 | Ataei et al. |
| 2021/0048723 A1 | 2/2021 | McManamon et al. |
| 2021/0048725 A1 | 2/2021 | McManamon et al. |
| 2021/0116778 A1 | 4/2021 | Zhang et al. |
| 2021/0311369 A1 | 10/2021 | McManamon et al. |
| 2022/0350135 A1 | 11/2022 | McManamon et al. |
| 2022/0350136 A1 | 11/2022 | McManamon et al. |
| 2022/0360037 A1 | 11/2022 | McManamon et al. |
| 2023/0161219 A1 | 5/2023 | McManamon et al. |
| 2023/0168560 A1 | 6/2023 | McManamon et al. |
| 2023/0296958 A1 | 9/2023 | Ataei et al. |
| 2023/0324762 A1 | 10/2023 | McManamon et al. |

FOREIGN PATENT DOCUMENTS

| | | |
|---|---|---|
| WO | 2020086111 A1 | 4/2020 |
| WO | 2020086692 A1 | 4/2020 |
| WO | 2020086111 A9 | 12/2020 |
| WO | 2021119165 A1 | 6/2021 |
| WO | 2021119165 A8 | 8/2021 |
| WO | 2021211162 A1 | 10/2021 |
| WO | 2021211163 A1 | 10/2021 |
| WO | 2022005554 A1 | 1/2022 |

OTHER PUBLICATIONS

"Symmetry", URL: https://www.britannica.com/science/symmetry-crystallography, Dec. 8, 2017, 1-2.

Cheng, Jierong, et al., "Real-time two-dimensional beam steering with gate-tunable materials: a theoretical investigation", Appl. Opt. 55,, 2016, pp. 6134-6144.

Gibson, Jennifer L., et al., "Wide Angle Decentered Lens Beam Steering for Infrared Countermeasures", Opt'Eng; Publication [online]. Mar. 31, 2004 [retrieved Dec. 26, 2020]. Retrieved from the Internet;, Mar. 31, 2004, 11 pages.

Glockner, Steffen, et al., "Micro-opto-mechanical beam deflectors", Opt Eng; Publication [online]. Jan. 12, 1997 [retrieved Dec. 31, 2020], Retrieved from the Internet; DOI:, Jan. 12, 1997, 7 pages.

Hassanfiroozi, Amir, et al., "Dual layer electrode liquid crystal lens for 2D/3D tunable endoscopy imaging system", Optics Express; vol. 24, No. 8, Apr. 18, 2016, 12 pages.

Hatcher, Burrell R., ""Granularity of beam positions in digital phased arrays"", Proceedings of the IEEE (vol. 56, Issue: 11, Nov. 1968), Nov. 1968, 1795-1800.

Isaenko, Ludmila, et al., "Properties of LiGaO.5InO.5Se2: A Quaternary Chalcogenide Crystal for Nonlinear Optical Applications in the Mid-IR, Crystals", 6, 85; doi:10.3390/cryst6080085., 2016, 10 pages.

Jiang, Tao, et al., "Low-DC Voltage-Controlled Steering-Antenna Radome Utilizing Tunable Active Metamaterial", IEEE Transactions on Microwave Theory and Techniques, vol. 60, No. 1, Jan. 2012, pp. 170-178.

Lou, Yimin, et al., "Design and fabrication of tunable liquid crystal diffractive lens", Optical Engineering 091713-1, vol. 52(9), 2013, 6 pages.

McManamon, Paul F., et al., "Broadband optical phased-array beam steering", Opt. Eng. 44, 128004, 2005, Dec. 2005, 1-5.

McManamon, Paul F., et al., ""Nonmechanical beam steering for active and passive sensors"", Downloaded From: https://www.spiedigitallibrary.org/conference-proceedings-of-spie on Aug. 22, 2019 Terms of Use: https://www.spiedigitallibrary.org/terms-of-use, 1993, 1-10.

(56) References Cited

OTHER PUBLICATIONS

McManamon, Paul F., et al., ""Optical Phased Array Technology"", Proc. IEEE 84(2), 268-298,, Feb. 1996, 268-298.
McManamon, Paul F., et al., "A Review of Phased Array Steering for Narrow-Band Electrooptical Systems", Proceedings of the IEEE | vol. 97, No. 6, Jun. 2009, 19 pages.
McManamon, Paul F., "LiDAR Technologies and Systems", https://doi.org/10.1117/3.2518254, 2019, p. 329.
Oliveri, Giacomo , et al., "Reconfigurable electromagnetics through metamaterials—a review", Proceedings of the IEEE, 103(7), 2015, pp. 1034-1056.
Orazbayev, B. , et al., "Graphene-dielectric metamaterial for beam steering", 2016 10th International Congress on Advanced Electromagnetic Materials in Microwaves and Optics (Metamaterials), 2016, 2016, pp. 253-255.
Orazbayev, B. , et al., "Tunable beam steering enabled by graphene metamaterials", Opt. Express 24, 2016, pp. 8848-8861.
Orazbayev, Bakhtiyar , et al., "Ultrafast beam steering based on graphene metamaterial", 2017 11th European Conference on Antennas and Propagation (EUCAP), 2017, pp. 3896-3899.
Pancharatnam, S. , "Achromatic combinations of birefringent plates—Part II. An achromatic quarter-wave plate", Indian Academy of Sciences, vol. 41, issue 4, Apr. 1955, pp. 137-144.
PCT/US19/57616 , "International Application Serial No. PCT/US19/57616, International Preliminary Report on Patentability mailed May 6, 2021", Exciting Technology LLC, 9 pages.
PCT/US19/57616 , "International Application Serial No. PCT/US19/57616, International Search Report and Written Opinion mailed Jan. 13, 2020", Exciting Technology LLC, 10 pages.
PCT/US2019/023915 , "International Application Serial No. PCT/US2019/023915, International Preliminary Report on Patentability mailed May 6, 2021", Exciting Technology LLC, 12 pages.
PCT/US2019/023915 , "International Application Serial No. PCT/US2019/023915, International Search Report and Written Opinion mailed Jul. 18, 2019", Exciting Technology LLC, 15 pages.
PCT/US2019/023915 , "International Application Serial No. PCT/US2019/023915, Invitation to Pay Additional Fees and, Where Applicable, Protest Fee mailed May 29, 2019", Exciting Technology LLC, 2 pages.
PCT/US2020/056253 , "International Application Serial No. PCT/US2020/056253, International Search Report and Written Opinion mailed Feb. 3, 2021", Exciting Technology LLC, 8 pages.
PCT/US2020/056254 , "International Application Serial No. PCT/US2020/056254, International Search Report and Written Opinion mailed Mar. 17, 2021", Exciting Technology LLC, 11 pages.
PCT/US2020/056254 , "International Application Serial No. PCT/US2020/056254, Invitation to Pay Additional Fees and, Where Applicable, Protest Fee mailed Jan. 11, 2021", Exciting Technology LLC, 2 pages.
PCT/US2020/064071 , "International Application Serial No. PCT/US2020/064071, International Preliminary Report on Patentability mailed May 17, 2022", Exciting Technology LLC, 13 pages.
PCT/US2020/064071 , "International Application Serial No. PCT/US2020/064071, International Search Report and Written Opinion mailed Apr. 16, 2021", Exciting Technology LLC, 14 pages.
PCT/US2020/064071 , "International Application Serial No. PCT/US2020/064071, Invitation to Pay Additional Fees and, Where Applicable, Protest Fee mailed Feb. 19, 2021", Exciting Technology LLC, 2 pages.
PCT/US2021/027986 , "International Application Serial No. PCT/US2021/027986, International Search Report and Written Opinion mailed Jul. 14, 2021", Exciting Technology LLC, 14 pages.
PCT/US2022/033640 , "International Application Serial No. PCT/US2022/033640, International Search Report and Written Opinion mailed Oct. 5, 2022", Exciting Technology LLC, 12 pages.
Rabinovich, William S., et al., "Two-dimensional beam steering using a thermo-optic silicon photonic optical-phased-array", Opt. Eng. 55(11), 111603 (2016), doi: 10.1117/1.OE.55.11.111603, 2016, 8 pages.
Reis, Joao , et al., "Two-dimensional antenna beamsteering using metamaterial transmitarray", 2015 9th European Conference on Antennas and Propagation (EuCAP), 2015, 2015, pp. 1-5.
Salary, Mohammad Mahdi, et al., "Electrically Tunable Metamaterials Based on Multimaterial Nanowires Incorporating Transparent Conductive Oxides", Scientific Reports 7: 10055, DOI:10.1038/S41598-017-09523-4, 2017, 14 pages.
Scheuer, Jacob , "Metasurfaces-based holography and beam shaping: engineering the phase profile of light", Nanophotonics 2017; 6(1):, 2017, pp. 137-152.
Shang, Xiaobing , et al., "Tunable Optical Beam Deflection Via Liquid Crystal Gradient Refractive Index Generated By Highly Resistive Polymer Film", IEEE Photonics Journal, vol. 8, No. 3, 2016, pp. 1-11.
Thalhammer, Gregor , et al., ""Speeding up liquid crystal SLMs using overdrive with phase change reduction"", Jan. 28, 2013 / vol. 21, No. 2 / Optics Express p. 1779-1797, Jan. 2013, 1779-1797.
Wang, X. , et al., ""Spatial resolution limitation of liquid crystal spatial light modulator"", Liquid Crystal Conference, Great Lakes Photonics Symposium, Cleveland, OH Jun. 7-11, 2004, Oct. 2004, 45-57.
Wolf, Omri , et al., "Enhanced optical nonlinearities in the near-infrared using III-nitride heterostructures coupled to metamaterials", Appl. Phys. Lett. 107, 151108 (2015); https://doi.Org/10.1063/1.4933332, 2015, 6 pages.
Wolf, Omri , et al., "Phased-array sources based on nonlinear metamaterial nanocavities", Nature Communications 6:7667 | DOI: 10.1038/ncomms8667 | www.nature.com/naturecommunications, 2015, 6 pages.
Yu, Nanfang , et al., "Flat optics with designer metasurfaces", Nature Materials | vol. 13, www.nature.com/naturematerials., Feb. 2014, 12 pages.
PCT/US2020/056253 , "International Application Serial No. PCT/US2020/056253, International Preliminary Report on Patentability mailed Oct. 13, 2022", Exciting Technology LLC, 9 pages.
PCT/US2020/056254 , "International Application Serial No. PCT/US2020/056254, International Preliminary Report on Patentability mailed Oct. 27, 2022", Exciting Technology LLC, 10 pages.
PCT/US2021/027986 , "International Application Serial No. PCT/US2021/027986, International Preliminary Report on Patentability mailed Jan. 12, 2023", Exciting Technology LLC, 15 pages.
21833255.9 , "European Application Serial No. 21833255.9, European Search Report mailed Aug. 29, 2023", Exciting Technology LLC, 11 pages.
Niu, Qifeng , et al., "High precision beam steering using a liquid crystal spatial light modulator", Optical and Quantum Electronics, Springer US, New York, vol. 51, No. 6, XP036790412, ISSN: 0306-8919, DOI: 10.1007/S11082-019-1858-0, May 24, 2019, pp. 1-13.

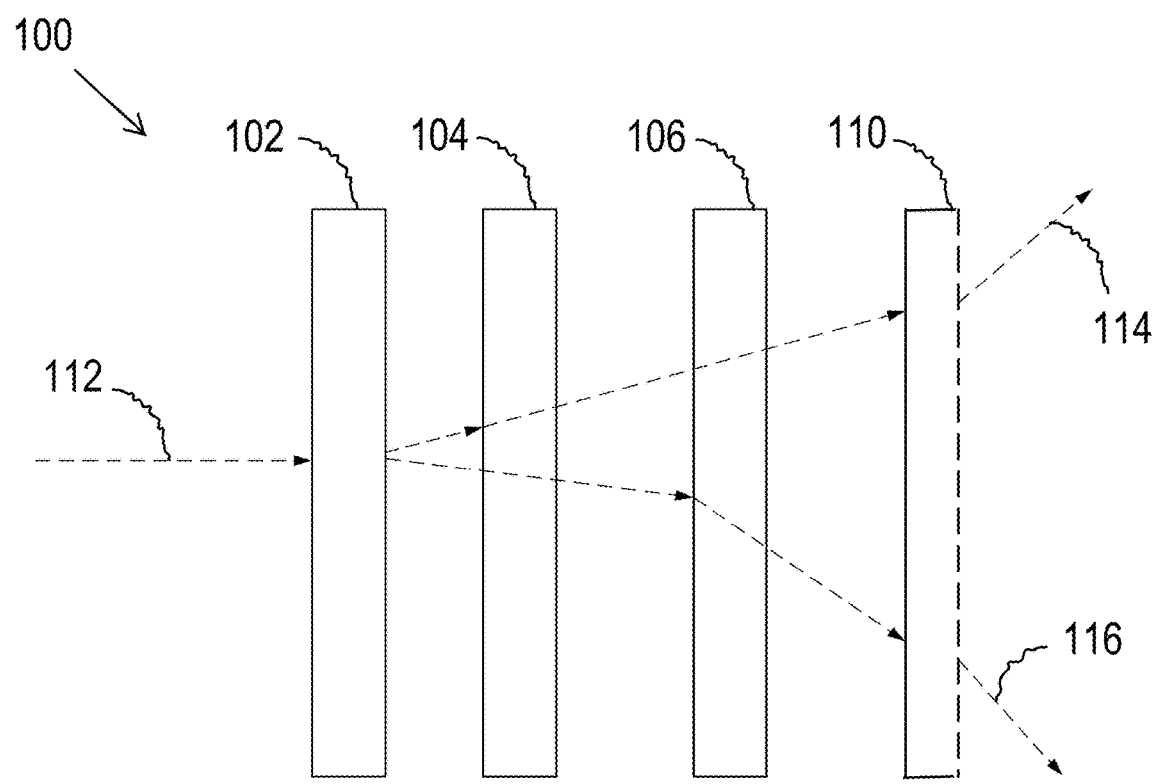
FIG. 1
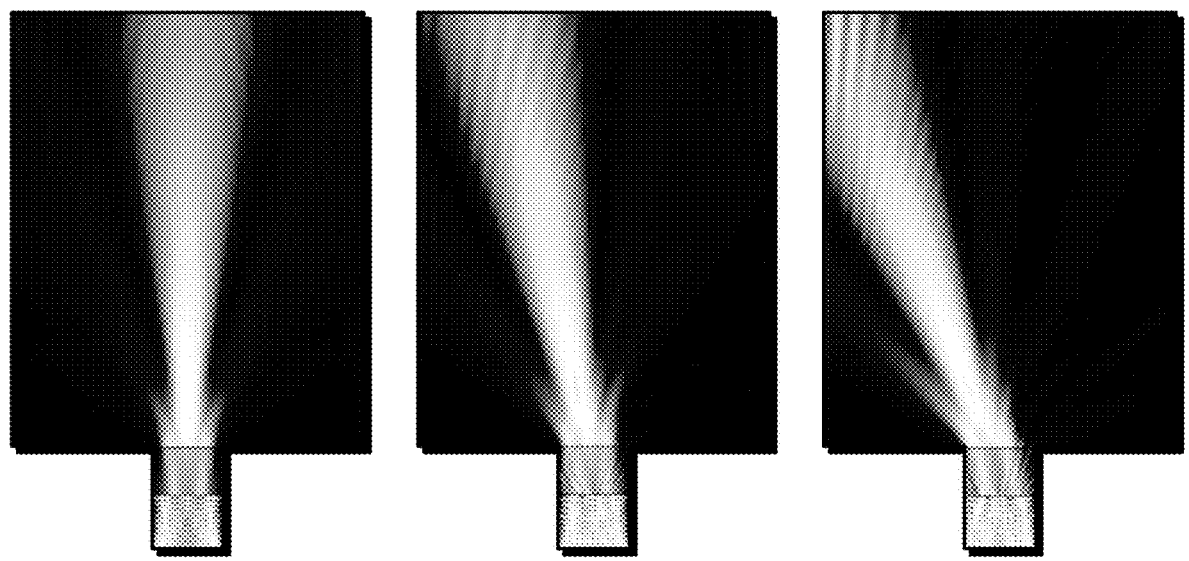
NO STEERING
FIG. 2
STEERING 12 DEG WITH
93.6% EFFICIENCY
FIG. 3
STEERING 20 DEG WITH
92.3% EFFICIENCY
FIG. 4

SYSTEM, METHOD, AND APPARATUS TO STEER AN ELECTROMAGNETIC BEAM UTILIZING STAGED STEERING

CLAIM OF PRIORITY

This application is a continuation of International Application No. PCT/US2020/064071, filed 9 Dec. 2020, and entitled "SYSTEM, METHOD, AND APPARATUS TO STEER AN ELECTROMAGNETIC BEAM UTILIZING STAGED STEERING", now published on Jun. 17, 2021, as WO 2021/119165.

International Application No. PCT/US2020/064071 claims the benefit of U.S. Provisional Application 62/945,720, filed on 9 Dec. 2019, and entitled "ELECTRO-OPTICAL (EO) BEAM STEERING TO A VERY WIDE ANGLE (>±60°)".

International Application No. PCT/US2020/064071 claims priority to, and is a continuation-in-part of, U.S. application Ser. No. 16/999,815, filed on 21 Aug. 2020, and entitled "SYSTEM, METHOD AND APPARATUS FOR NON-MECHANICAL OPTICAL BEAM STEERING", now issued on Dec. 5, 2023, as U.S. Pat. No. 11,835,841.

International Application No. PCT/US2020/064071 claims priority to, and is a continuation-in-part of, U.S. application Ser. No. 16/916,731, filed on 30 Jun. 2020, and entitled "SYSTEM, METHOD AND APPARATUS FOR NON-MECHANICAL OPTICAL AND PHOTONIC BEAM STEERING", now issued on Apr. 27, 2021, as U.S. Pat. No. 10,989,982.

U.S. application Ser. No. 16/999,815 is a continuation of International Application No. PCT/US2019/023915, filed Mar. 25, 2019 entitled "SYSTEM, METHOD AND APPARATUS FOR NON-MECHANICAL OPTICAL AND PHOTONIC BEAM STEERING", now published on Apr. 30, 2020, as WO 2020/086111, which claims priority to U.S. Provisional Patent Application No. 62/749,487, filed on Oct. 23, 2018, entitled "SYSTEM, METHOD AND APPARATUS FOR NON-MECHANICAL OPTICAL AND PHOTONIC BEAM STEERING".

PCT/US2019/023915, filed Mar. 25, 2019 also claims priority to, and is a continuation-in-part of, U.S. patent application Ser. No. 15/796,055, filed on Oct. 27, 2017, entitled "SYSTEM, METHOD AND APPARATUS FOR NON-MECHANICAL OPTICAL AND PHOTONIC BEAM STEERING", now issued on Nov. 24, 2020, as U.S. Pat. No. 10,845,671.

U.S. application Ser. No. 16/916,731 is a continuation of International Application No. PCT/US19/57616, filed Oct. 23, 2019, entitled "SYSTEM, METHOD AND APPARATUS FOR NON-MECHANICAL OPTICAL AND PHOTONIC BEAM STEERING, now published on Apr. 30, 2020, as WO 2020/086692.

PCT/US19/57616, filed Oct. 23, 2019 claims priority to U.S. Provisional Patent Application No. 62/868,286, filed on Jun. 28, 2019, entitled "SYSTEM, METHOD AND APPARATUS FOR NON-MECHANICAL OPTICAL AND PHOTONIC BEAM STEERING".

PCT/US19/57616, filed Oct. 23, 2019 also claims priority to U.S. Provisional Patent Application No. 62/749,487, filed on Oct. 23, 2018, entitled "SYSTEM, METHOD AND APPARATUS FOR NON-MECHANICAL OPTICAL AND PHOTONIC BEAM STEERING".

PCT/US19/57616, filed Oct. 23, 2019 further claims priority to, and is a continuation-in-part of, PCT application PCT/US19/23915, filed on Mar. 25, 2019, and entitled "SYSTEM, METHOD AND APPARATUS FOR NON-MECHANICAL OPTICAL AND PHOTONIC BEAM STEERING".

Each of the foregoing applications is incorporated herein in the entirety, for all purposes.

BACKGROUND

For multiple decades there has been interest in steering electromagnetic (EM) radiation rapidly to large angles quickly, with random access, and with no moving parts. Most current wide angle steering devices include moving, mechanical parts to steer light efficiently over wide angles. Gimbals are one example of such a steering device. Gimbals are expensive, are not random access, and are not very rapid, but they can steer efficiently over large angles.

SUMMARY

An example system for steering an electromagnetic (EM) beam includes a first continuous steering layer configured to steer an incident beam from an EM source to a first selected angle, and incident on a second continuous steering layer, and the second continuous steering layer configured to further steer the incident beam to a target steering angle value.

Certain further aspects of the example system are described following, any one or more of which may be included in certain embodiments. An example system includes where the second continuous steering layer includes a thin beam steering device. The example thin beam steering device may include one or more of: a modulo $2\pi n$ steering device; a chess scanner arrangement; a castle scanner arrangement; and/or a beam steering device utilizing a half-wave voltage profile. An example thin beam steering device includes a steering capability of at least 15 degrees (e.g., +/−15 degrees for a normal incident beam), and/or less than 25 degrees. An example system includes a fishtail booster associated with the thin beam steering device, and/or where the thin beam steering device and the associated fishtail booster include a combined steering capability of greater than 25 degrees, and/or less than 30 degrees. An example system includes the first continuous steering layer provided as a thin beam steering device, a thin beam steering device associated with a fishtail booster, a bulk beam steering device, and/or a bulk beam steering device having a concave emission face. An example system includes the first continuous steering layer provided as a thin beam steering device. An example system includes the thin beam steering device of the first continuous layer including one or more of: a modulo $2\pi n$ steering device; a chess scanner arrangement; a castle scanner arrangement; and/or a beam steering device utilizing a half-wave voltage profile. An example system includes the thin beam steering device of the first continuous layer having a steering capability of at least 15 degrees, and/or less than 25 degrees.

An example system includes a polarization birefringence grating (PBG) interposed between an electromagnetic (EM) source and a first volume hologram, the first volume hologram interposed between the PBG and a second volume hologram, the second volume hologram interposed between the first volume hologram and a continuous steering element, where the PBG is responsive to a polarization of an incident beam from the EM source to selectively steer the incident beam to one of a first selected angle or a second selected angle, where the first volume hologram is responsive to the first selected angle of the incident beam to increase a steered angle of the incident beam in a direction of the first selected angle, and where the second volume hologram is responsive to the second selected angle of the incident beam to increase the steered angle in a direction of the second selected angle.

Certain further aspects of the example system are described following, any one or more of which may be included in certain embodiments. An example system includes the continuous steering element provided as a thin beam steering device, which may additionally be one or more of a modulo $2\pi n$ steering device, a device having a chess scanner arrangement, a device having a castle scanner arrangement, and/or a device utilizing a half-wave voltage profile. An example system includes the thin beam steering device having a steering capability (e.g., relative to a normal incident beam) of at least 15 degrees (e.g., +/−15 degrees), and/or less than 25 degrees. An example system includes the thin beam steering device having an associated fishtail booster, and/or where the thin beam steering device and associated fishtail booster have a combined steering capability (e.g., relative to a normal incident beam) of greater than 25 degrees. An example beam steering system includes a final steering capability (e.g., from initial incident beam to final steered beam, and/or from received EM radiation from a selected location back to an EM detection device) of greater than 30 degrees, greater than 45 degrees, and/or between 45 degrees and 60 degrees. An example beam steering system includes an arbitrarily selectable final steering capability of up to +/−90 degrees. An example beam steering system includes a capability of up to 60 degrees (e.g., +/−60 degrees) and a steering efficiency of greater than 90%.

An example system includes a steering controller having a steering request circuit structured to interpret a steering request value, a steering configuration circuit structured to determine a number of electro-optical command values in response to the steering request value, and where the thin beam steering device is responsive to the number of EO command values to provide a corresponding phase delay progression across the thin beam steering device. An example system further includes where the steering configuration circuit is further structured to determine a polarization orientation in response to the steering request value, and a selectively polarized electromagnetic source structured to provide the incident beam to the PBG at a selected one of a first polarization corresponding to the first angle, or a second polarization corresponding to the second angle, and where the selectively polarized electromagnetic source is responsive to the steering request value.

An example method includes directing an incident electromagnetic (EM) beam to a selected one of a first selected angle or a second selected angle, increasing the selected one of the first selected angle or the selected second angle with a volume hologram responsive to the selected one of the first selected angle or the second selected angle, and steering the incident EM beam to a final steering angle with a thin beam steering device.

Certain further aspects of the example method are described following, any one or more of which may be present in certain embodiments. An example method includes directing the incident EM beam to the selected one of the first selected angle or the second selected angle by providing the incident EM beam having a selected polarization to a polarization birefringence grating. The example method includes steering the incident EM beam to a final steering angle by providing a scheduled phase delay progression across the thin beam steering device, by utilizing a fishtail booster associated with the thin beam steering device, and/or by utilizing a half-wave voltage profile to provide the scheduled phase delay.

An example optical steering apparatus includes a discrete steering element structured to steer an incident electromagnetic (EM) beam at a selected one of a first angle or a second angle, and a continuous steering element structured to further steer the incident beam at a controllable angle.

Certain further aspects of the example apparatus are described following, any one or more of may be present in certain embodiments. An example optical steering apparatus includes the discrete steering element provided as a polarization birefringence grating; a selectively polarized electromagnetic source structured to provide the incident beam to the discrete steering element at a selected one of a first polarization corresponding to the first angle, or a second polarization corresponding to the second angle; and/or a volume hologram interposed between the between the polarization birefringence grating and the continuous steering element. The example volume hologram is configured to increase the selected first angle to an increased first angle, and/or increase the selected second angle to an increased second angle. In certain embodiments, a volume hologram is configured to selectively provide either of the increased first angle or increased second angle, in response to incident light on the volumetric hologram having a corresponding selected incident angle. In certain embodiments, a first volume hologram selectively provides the increased first angle in response to incident light having a selected incident angle for the first volume hologram, and a second volume hologram selectively provides the increased second angle in response to incident light having a selected incident angle for the second volume hologram. In certain embodiments, a further volume hologram is interposed between the previous volume hologram(s), and further increases the increased first angle and/or second increased angle (e.g., as a second volume hologram stage). In certain embodiments, the further volume hologram may be implemented as a single volume hologram configured to provide the further increase to the increased first angle and/or second increased angle. In certain embodiments, the further volume hologram may be implemented as a pair of volume holograms, with one of the pair providing the increase to the increased first angle, and the other one of the pair providing the increase to the increased second angle. An example optical steering apparatus include the continuous steering element provided as a thin beam steering device. The example thin beam steering device may include one or more of: a modulo $2\pi n$ steering device; a chess scanner arrangement; a castle scanner arrangement; and/or a steering device utilizing a half-wave voltage profile.

An example optical steering apparatus includes a steering controller, the steering controller including a steering request circuit structured to interpret a steering request value, a steering configuration circuit structured to determine a number of electro-optical (EO) command values in response to the steering request value, and where the thin beam steering device is responsive to the number of EO command values to provide a corresponding phase delay progression across the thin beam steering device. A further example optical steering apparatus includes where the discrete steering element includes a polarization birefringence grating, where the steering configuration circuit is further structured to determine a polarization orientation in response to the steering request value, and a selectively polarized electromagnetic source structured to provide the incident beam to the discrete steering element at a selected one of a first polarization corresponding to the first angle, or a second polarization corresponding to the second angle, and where the selectively polarized electromagnetic source is responsive to the steering request value.

An example optical steering apparatus includes a second continuous steering element structured to provide the incident beam to the discrete steering element, and where the discrete steering element includes a volume hologram. An example continuous steering element and/or second continuous steering element includes a thin beam steering device. An example optical steering apparatus includes a fishtail booster associated with the continuous steering element. An example fishtail booster includes a meniscus lens at least partially defining the continuous steering element. In certain embodiments, the continuous steering element and/or the second continuous steering element (where present) is implemented as one or more of: a castle arrangement device, a castle pro arrangement device, a chess arrangement device, a chess pro arrangement device, a half-wave voltage device, a bulk steering device, and a bulk steering device comprising a concave emission surface. An example optical steering apparatus includes the continuous steering element (e.g., positioned at a downstream or emissions end of an optical path of the optical steering device) provided as a thin beam steering device, and/or a thin beam steering device associated with a fishtail booster. An example optical steering apparatus includes the continuous steering element (e.g., positioned at an upstream or source end of an optical path of the optical steering device) provided as a thin beam steering device, a thin beam steering device associated with a fishtail booster, a bulk beam steering device, and/or a bulk beam steering device having a concave emission face.

BRIEF DESCRIPTION OF THE DRAWINGS

FIG. 1 is a schematic depiction of a system for steering an EM beam.

FIGS. 2-4 are illustrative depictions for steering capability of a continuous steering element.

DETAILED DESCRIPTION

Figure 5:
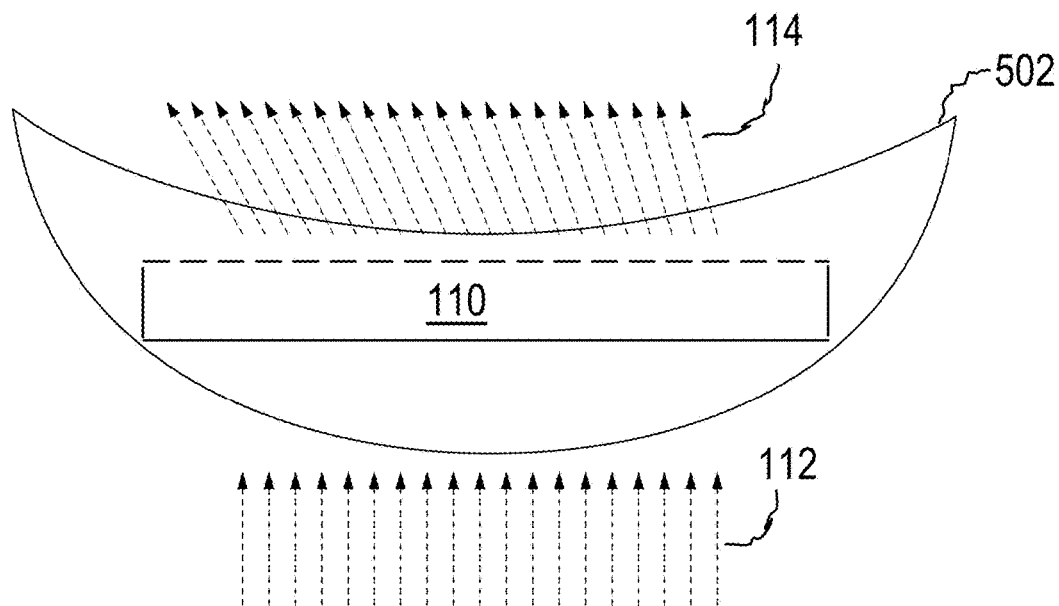
FIG. 5 is a schematic depiction of a thin beam steering device associated with a fishtail booster.

Certain embodiments herein utilize a polarization birefringence grating (PBG). A PBG selectively steers an incident beam to a selected fixed angle left or right, where the direction is dependent upon the polarization of the incoming light. PBGs, as utilized herein, can reference either birefringement gratings (e.g., a sawtooth birefringement grating), but may also reference birefringement prisms. PBGs may be responsive to either circular/elliptical polarization or to linear polarization. PBGs adjust the steering angle by a fixed amount, and are generally capable of a few degrees of steering. PBGs steering to larger angles, without other elements as set forth herein, require multiple stages and therefore accumulating efficiency losses with each stage, and for prism based PBGs the thickness requirement for the birefringement prism may be large enough (e.g., 20° steering with a 0.2 birefringence index and a 5 cm aperture would be 8 cm thick), which can drive sizing, cost, and weight issues, in addition to walkoff complications (e.g., where the steered beam at least partially impinges on a side wall of the optical path, steering device, etc.). Additionally, utilization of steering using multiple stages of PBGs, and more than one steering direction (e.g., azimuthal and elevation) may result in additional stages for polarization management (e.g., half-wave plates, etc.), leading to additional efficiency losses. PBGs are capable to steer normal beams (e.g., the initial incident EM beam, and/or received EM radiation from a target observed location), and/or to additively steer to a beam that is already steered to some extent. Accordingly, as set forth throughout the present disclosure, PBGs have features that provide benefits for certain embodiments, and are included, for at least certain steering layers, in certain embodiments of the present disclosure. In certain embodiments, high capability and high efficiency beam steering devices of the present disclosure do not include a PBG.

Certain embodiments herein utilize a volume hologram. A volume hologram may be implemented in any material known in the art, but an example includes photo-thermal glass. The volume hologram is created with one or more reference beams, providing for steering of a signal beam (e.g., an incident beam from an EM source and/or received EM radiation from an observed location) at a discrete angle. The volume hologram is responsive to an incident EM beam at a specific angle (and/or at a number of specific angles), and steers the incident EM beam received at the specific angle to a discrete selected angle. Accordingly, a volume hologram provides for a convenient discrete steering step for the incident EM beam—for example receiving the incident EM beam at a first angle (e.g., 2 degrees off-center), and steering it to a second angle (e.g., 5 degrees of steering, or 7 degrees off-center, in the example). The volume hologram does not provide steering action for incident EM radiation that is not at one of the selected angles, for example a normal (perpendicular) incident EM beam. Accordingly, a volume hologram supports embodiments where a beam incident to the volume hologram is controllably at the selected angle(s), or not, and where a discrete steering angle applied is desired at the volume hologram stage. Volume holograms are generally efficient, over 99% efficient with a single hologram written into a single piece of glass, and still about 98% efficient with two holograms written into the single piece of glass. Volume holograms are capable to sustain high power throughput. However, the limitations of volume holograms, including only diffracting light of the proper wavelength and incidence angle, as well as emitting light at a fixed steering angle, introduce complications that can lead to increased losses, cost, and the like. For example, steering to high angles in a number of stages, steering in two axes (e.g., elevation and azimuth), and steering in multiple directions (e.g., 40° each right and left) can lead to a large number of volume hologram stages to provide sufficient steering capabilities for an application. Each stage is efficient for diffraction considerations, but introduces scattering, reflection, and absorption losses, and many stages together can lead to significant losses. Additionally, with multiple stages of a volume hologram, walkoff considerations may limit some applications, and/or lead to an increase in size, weight, etc. for a beam steering device. Additionally, the requirement of a volume hologram for a specific incident light angle, and the discrete steering nature of the volume hologram, can lead to added expense to manage these capabilities, such as the use of a continuous steering device before the volume hologram (e.g., to provide a selected incident angle for the volume hologram) and after the volume hologram (e.g., to provide steering to a desired location). Accordingly, as set forth throughout the present disclosure, volume holograms have features that provide benefits for certain embodiments, and are included, for at least certain steering layers, in certain embodiments of the present disclosure. In certain embodiments, high capability and high efficiency beam steering devices of the present disclosure do not include a volume hologram.

Embodiments herein reference steering of an incident EM beam, for clarity of the present disclosure. Embodiments described throughout the present disclosure additionally contemplate steering of an optical guide path (e.g., a "beam steering device," "optical steering device," "optical steering apparatus", and/or other terms) from an observed region (e.g., a target area, object, scanned area, etc.) to a target location (e.g., a photonic array, sensor, camera, and/or other optical observation device). Embodiments steering an EM beam provided by an EM source for clarity and convenience of the description.

The terms optical light, optical, EM radiation, EM beam, light, photonic beam, and other similar terms as used throughout the present disclosure should be understood broadly. The present disclosure contemplates steering EM radiation of any type depending upon the application and the available materials. In certain embodiments, EM radiation as utilized herein contemplates optical light, or light that is within the visible spectrum. In certain embodiments, optical light additionally includes at least a portion of the ultra-violet spectrum, and/or at least a portion of the infra-red spectrum. In certain embodiments, optical light and/or EM radiation includes one or more contemplated wavelengths and/or portions of the EM spectrum, and does not include portions of the EM spectrum that may otherwise be considered "optical light" outside the context of the particular system. It will be understood that various electro-magnetic wavelengths of interest are contemplated herein, including wavelengths that are not visible, and/or are not typically described as optical wavelengths or "light." Without limitation, the terms optical and light, as used herein, include at least infrared, visible, and ultra-violet frequencies, and in certain embodiments may include frequencies of the electromagnetic spectrum that are outside these ranges.

Embodiments herein reference "thin" beam steering devices. Certain examples further include a modulo $2\pi n$ steering device, a device having a chess arrangement, a device having a castle arrangement, a device having a chess pro arrangement, a device having a castle pro arrangement, and/or a device utilizing a half-wave voltage profile. Without limitation to any other aspect of the present disclosure, any descriptions of these terms as set forth in US PCT application PCT/US2019/023915 are contemplated herein (which is incorporated by reference herein, and to which the present disclosure claims priority). Embodiments herein may be referenced as a thin beam steering device, thin beam steering scanner, and/or other similar terminology.

Without limitation, a "chess" configuration includes adjacent physical layers of a beam steering device alternating such that an incident EM beam passes through one or the other of the active cells from one of the electro-optical (EO) active layers. In certain embodiments, a chess configuration includes active cells from adjacent layers being sized the same (e.g., thickness, width, or both). In certain embodiments, a beam steering device in a chess configuration having one or more resistive high-side electrodes may be referenced as a chess pro configuration herein.

Figure 11:
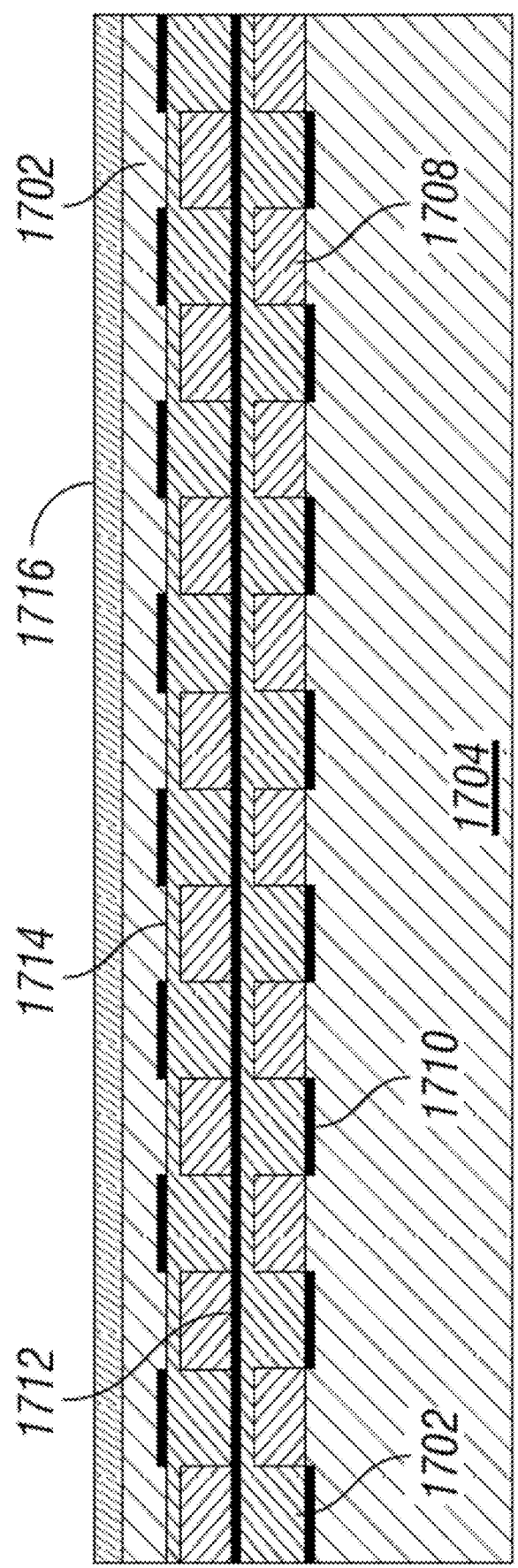
FIG. 11 is a schematic depiction of a thin beam steering device in a chess arrangement.

Referencing FIG. 11, an example embodiment of a beam steering device having a chess configuration is depicted. The example of FIG. 11 includes two active layers, with an EO active material 1706 providing a number of active cells, each active cell positioned between one of a number of discrete high-side electrodes 1710 and a low-side electrode 1712 (a shared common ground electrode in the example of FIG. 11). The example beam steering device includes insulators 1708 positioned between each of the high-side electrodes 1710, and a substrate 1702, 1704 provided on each side of the active layer. The example of FIG. 11 further includes a reflective layer 1716. The example of FIG. 11 may additionally include more active layers, and the substrate 1702, 1704 may be positioned between each active layer and/or book-end the active layers. The example of FIG. 11 is an example of a Chess Pattern beam steering device, with offset active cells in adjacent active layers, such that an incident EM beam passes through one or the other of the active layers. FIG. 11 includes a bridging portion 1714 of the EO active material 1706 across the insulation region (1708), which may provide for ramp smoothing of the progressive phase delay, and/or may provide for easier fabrication and/or improved mechanical properties of the beam steering device.

Without limitation, a "castle" configuration includes EO active layers having thick and thin elements. In certain embodiments, a castle configuration includes both the thick and thin elements making up active cells of the beam steering device (e.g., having an associated discrete high-side electrode). In certain embodiments, a castle configuration includes adjacent physical layers of the beam steering device having alternating thick and thin elements, such as that depicted in FIG. 16. In certain embodiments, a beam steering device in a castle configuration having one or more resistive high-side electrodes may be referenced as a castle pro configuration herein.

Figure 12:
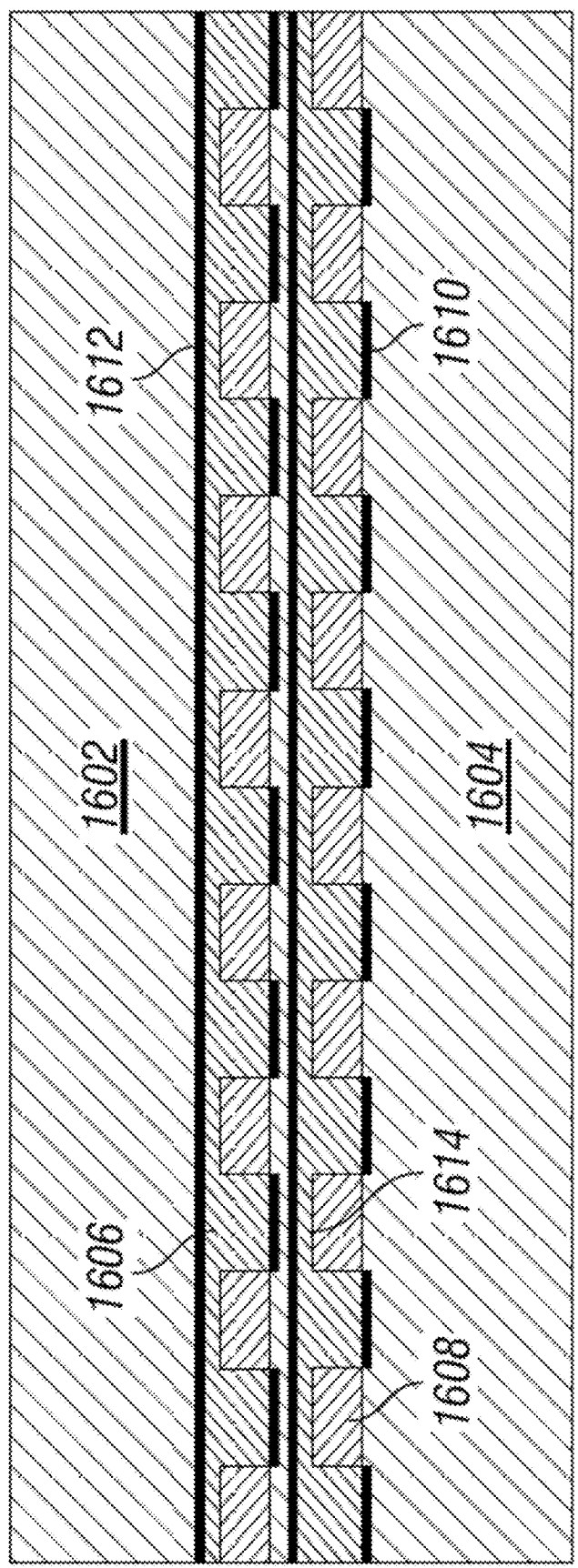
FIG. 12 is a schematic depiction of a thin beam steering device in a castle arrangement.

Referencing FIG. 12, an example embodiment of a beam steering device having a castle configuration is depicted. The example of FIG. 12 includes two active layers, with an EO active material 1606 providing a number of active cells, each active cell positioned between one of a number of discrete high-side electrodes 1610 and a low-side electrode 1612 (depicted as a common ground electrode in the example of FIG. 12). The example beam steering device includes insulators 1608 positioned between each of the high-side electrodes 1610, and a substrate 1602, 1604 provided on each side of the active layer. The example of FIG. 12 may additionally include more active layers, and the substrate 1602, 1604 may be positioned between each active layer and/or book-end the active layers. The example of FIG. 12 is an example Chess Pattern beam steering device, with offset active cells in adjacent active layers, such that an incident EM beam passes through one or the other of the active layers. FIG. 12 includes a bridging portion 1614 of the EO active material 1606 across the insulation region (1608), which may provide for ramp smoothing of the progressive phase delay, and/or may provide for easier fabrication and/or improved mechanical properties of the beam steering device.

Without limitation, a half-wave voltage profile enforces a maximum fringing field region (flyback distance) that is equal to the distance between discrete electrodes of a thin beam steering device. For comparison, a castle arrangement enforces a maximum flyback distance that is a width of one discrete electrode, and a chess arrangement enforces a maximum flyback distance that is a theoretical value of zero (e.g., where each electrode is surrounded by an insulator, limiting the edge effect at the extent of the electrode).

Figure 13:
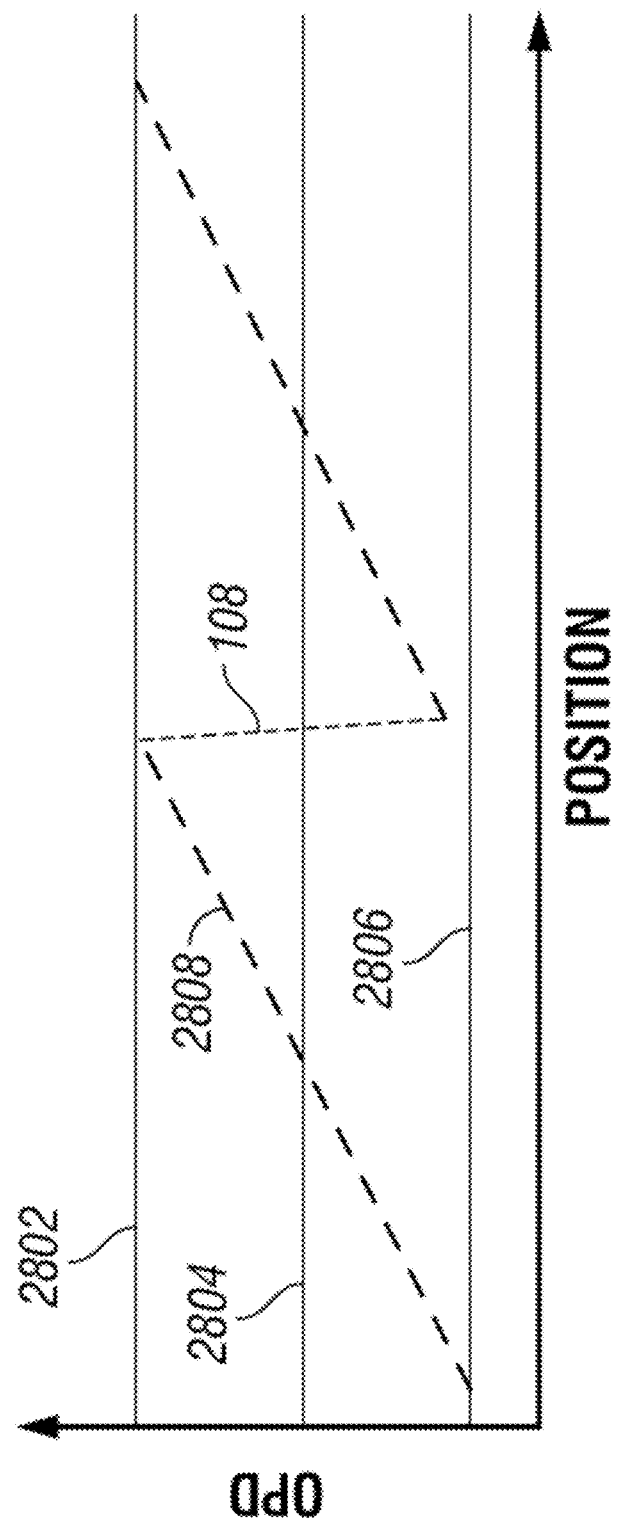
FIG. 13 is an illustrative depiction of a half-wave voltage profile.

Referencing FIG. 13, an example depiction of a realistic phase profile 2808 which, according to modeling and calculations, it is believed to be achievable using various aspects of the present disclosure. In the example of FIG. 13, the OPD progression 2806 (e.g., a phase delay progression across an active layer of a thin beam steering device) is depicted as being above and below a nominal voltage 2804, with a positive and negative voltage relative to the nominal voltage, and may be referenced as a half-wave voltage profile. Additionally, in the example of FIG. 13, the aspect ratio is provided with a value of about 1. In the example of FIG. 13, the reset 108 occurs between a positive voltage electrode and a negative voltage electrode. It has been found that a voltage profile such as that depicted in FIG. 13, combined with an aspect ratio of about 1, provides for a rapid reset of the voltage with fringing field region limited to the distance between electrodes even without the utilization of insulators, providing a significant decrease in fringing field losses at the reset. The example of FIG. 13 depicts resistive electrodes, although conductive electrodes may also be utilized. Because the maximum voltage in the EO active layer is one-half of the voltage in a nominal voltage phase delay profile (e.g., reset from a $2\pi$ delay voltage to a zero delay voltage), the thickness of the EO active layer using a half-wave voltage profile can be one-half of the thickness utilized for a nominal voltage phase delay profile. Additionally, the addition of a reflective layer (e.g., a reflective substrate, reflective ground electrode, or a dedicated reflective layer) can provide for a thickness of one-fourth the thickness utilized for a nominal voltage phase delay profile.

Embodiments herein reference "bulk" steering devices, including bulk steering devices having a convex emission face. Without limitation to any other aspect of the present disclosure, any descriptions of these terms as set forth in US PCT application PCT/US19/57616 are contemplated herein (which is incorporated by reference herein, and to which the present disclosure claims priority), including at least as represented in FIGS. 33-53, 59-61, 64, 66-69, and 74, and the related descriptions.

Embodiments herein reference a "fishtail booster", "meniscus lens", and/or similar terms. Without limitation to any other aspect of the present disclosure, any descriptions as set forth in US PCT application PCT/US19/57616 are contemplated herein, including at least as represented in FIGS. 62-63 and the related descriptions.

Wherever a wavelength is recited (e.g., of light, EM radiation, and/or an optical or photonic beam) and/or where $\lambda$ is recited, throughout the present disclosure, it will be understood that the wavelength (or $\lambda$) may be a nominal wavelength, a particular wavelength, and/or an effective wavelength. For example, a nominal wavelength may be the wavelength of a target or considered EM radiation frequency in a vacuum, in air, or under selected conditions. In another example, a particular wavelength may be a wavelength of a target or considered EM radiation frequency at specific conditions, such as through an EO active material at a selected voltage value (e.g., thereby at a selected refractive index for that frequency of EM radiation). In another example, an effective wavelength may be the in-situ wavelength of the EM radiation frequency in the EO active material, an average of certain values (e.g., an average of the high- and low-phase delayed values in a given active cell, etc.), and/or one or more active cells may be configured for distinct $\lambda$ values, even for a particular frequency of EM radiation (e.g., depending upon the current, expected, or designed optical conditions for the one or more active cells). Accordingly, $\lambda$ should be understood throughout the present disclosure to indicate any of these usages. One of skill in the art, having the benefit of the present disclosure and information ordinarily available when contemplating a particular system and/or an aspect of the system, can readily determine which usage of $\lambda$ is relevant for the particular system and/or the aspect of the system. Certain considerations for determining which one or more usage of $\lambda$ applies to a particular system or aspect of the system include, without limitation: the optical characteristics of the EO active material(s) of the system; the phase delay progression planned for the system; the voltage profile and/or optical characteristic profile of the system; the efficiency considerations for the system including the cost of power, the risks related to side lobes, and/or the costs associated with undesired thermal generation in relevant parts of the system; the duty cycle of operating conditions (e.g., power throughput, steering directions and magnitudes, and/or on-time); and/or the steering capability (e.g., degree of steering, number of axes of steering, and/or number of polarities of steering) to be supported by the system.

An important parameter for beam steering is steering efficiency. As used herein, the term steering efficiency should be understood broadly. Various options and configurations described throughout the present disclosure affect different aspects of the steering efficiency, and accordingly it will be understood by one of skill in the art, having the benefit of the present disclosure, how to determine which aspects of the present disclosure are important to varying embodiments. Without limitation, steering efficiency can be understood to include energy transport considerations, cost considerations, risk considerations, and/or capability considerations. Without limitation, steering efficiency can be understood to be any one or more of the following: the amount of incident energy of the EM on the beam steering device that reaches the targeted location; the similarity of the phase profile of the steered EM beam on reach the target relative to the incident EM beam and/or relative to an idealized prism; the amount of energy of the incident EM beam that does not reach the target location (e.g., side lobes and/or heating losses); the amount of energy of the incident EM beam that creates an undesirable effect (e.g., a concentrated side lobe); the amount of energy of the incident EM beam that dissipates as heat and/or where the heat is dissipated; the number of electro-optical (EO) layers utilized to achieve a given steering capability; the cost of manufacture (e.g., materials, fabrication, testing, etc.) for a particular design; the opportunity cost of a lower system capability (e.g., steering amount, wavelengths supported, profile consistency, etc.); the capital and/or operating cost of a higher system capability; and/or the risk cost of a particular steering device (e.g., due to side lobes and/or the particular arrangements of the side lobes, wavelength selections which may have varying risks, and/or system reliability or power consumption which may put certain applications at risk).

Certain considerations to determine which steering efficiency factors are important for a particular application include, without limitation: the utilization environment for the beam steering device including robustness to side lobes; EM wavelength values to be utilized; capital cost sensitivity; operating cost sensitivity; costs and availability of power for the beam steering device in use; costs and availability of computing power for the beam steering device in use; costs, availability, and capability for manufacturing including materials and fabrication; the critical mission aspects for a particular application such as targeting capability, response time, and similarity of phase profile requirements; and/or the sensitivity of parts of the beam steering device and/or the utilization environment to heating and/or side lobe energy from beam steering operations. One of skill in the art, having the benefit of the disclosure herein and information ordinarily available when contemplating a particular system, can readily determine which factors of steering efficiency determinations are important to a particular embodiment, and further which features of systems and/or techniques described throughout the present disclosure relate to those factors of steering efficiency. The foregoing sets forth an example of certain considerations for certain systems, and any other considerations set forth throughout the present disclosure may also be utilized in configuring a particular embodiment of the present disclosure.

Referencing FIG. 1, an example system 100 of the present disclosure is depicted. The example system 100 includes a beam steering device having a wide angle capability and preserving steering efficiency using a number of aspects of the present disclosure. The specific implementation of FIG. 1 is provided for illustration, and the components of the example are not limiting to the present disclosure. The example system 100 includes an incident beam 112 to be steered to a selected location (e.g., a target area, a sweep area during a scan, etc.). The example beam steering device 100 may additionally or alternatively direct the optical path to a target location, observed location, etc., to receive the EM beam 112 at a detection array, photonic array, sensor, etc. The example system 100 includes a PBG 102, which may be a polar birefringence grating, a birefringement prism, or the like. In the example where optical element 102 is a PBG, the example system 100 includes the PBG 102 steering the incident beam 112 to an offset angle, which is selectable based on the polarization of the incident beam 112. The example system 100 further includes a first volume hologram 104 and a second volume hologram 106. The volume holograms 104, 106 adjust the angle (e.g., steer) of the incident EM beam 112 for light received at a specific angle (e.g., the upper beam 114 received at the first volume hologram 104, or the lower beam 116 received at the second volume hologram 106), and pass through light received at another angle (e.g., the upper beam 114 received at the second volume hologram 106, or the lower beam 116 received at the first volume hologram 104). The example system 100 includes a thin beam steering device 110, which provides for continuous steering of the final emitted beam (e.g., 114 or 116). It can be seen that the thin beam steering device 110 steers relative to the incident angle into the thin beam steering device 110, and is approximately additive to the available angles of the incident light. For example, if the PBG 102 and volume hologram 104, 160 combination is capable to +/−20 degrees (e.g., 20 degrees "up" or "left" for the upper path 114, and 20 degrees "down" or "right" for the lower path 116), then a thin beam steering device 110 capable of steering to +/−20 degrees results in a beam steering device 100 capable to steer to +/−40 degrees. The example of FIG. 1 depicts steering in a given axis (e.g., elevation, azimuth, or other selected axis). It can be seen that additional steering layers (e.g., PBGs, volume holograms, thin and/or bulk steering devices 110, etc.) can be provided to steer in additional axes. In certain embodiments, inclusion of polarization management, etc., may be provided between steering layers according to the response of devices in the layers (e.g., PBGs, volume holograms, etc.) to the polarization of the incident beam 112 as it progresses through the system 100.

The specific example of FIG. 1 provides for a number of benefits. For example, the utilization of a PBG 102 provides for a convenient application of a selected steering angle, for example utilized by the volume hologram(s) 104, 106, and efficient discrete steering by the volume holograms 104, 106 to an extended angle, providing for an enhancement to the baseline steering capability of the thin beam steering device 110. Embodiments of the example of FIG. 1 can readily be constructed to provide for a capability of +/−60 degrees of steering, with an overall steering efficiency of over 90%. It will be noted that the geometric efficiency (or "cosine efficiency") at 60 degree steering, with a flat emission surface (e.g., the right hand face of the thin beam steering device 110 in the depiction of FIG. 1) will be 0.5 (or COS 60°), which is a physical constraint on any beam steering device. The geometric efficiency can be increased with the utilization of a curved emission surface, for example as set forth in embodiments of the present disclosure utilizing a fishtail booster (or meniscus lens), such as set forth in FIG. 5 and the related disclosure.

It will be understood that the phase delay progression profile across the continuous steering element 110 will be adjusted to account for the incident angle of light (e.g., from the left side in FIG. 1) to achieve the desired steering angle and optical characteristics. For example, the phase wave front of the incident beam 112 is not perpendicular when the discrete steering elements 102, 104, 106 are active. Accordingly, the phase delay progression (e.g., reference FIG. 13) may be adjusted to provide a selected steering, phase profile, and the like for the emitted beam 114, 116, and/or to configure received EM radiation (e.g., compensating for the discrete steering elements 102, 104, 106 back into an EM detector receiving EM radiation 112—not shown).

Certain additional and/or optional features of FIG. 1 are described following, which are not limiting to the embodiments contemplated in the present disclosure. An example system includes a continuous steering device (e.g., a thin beam steering device, a bulk steering device, etc.), either at the position of the PBG 102, and/or replacing all or a portion of the PBG 102, first volume hologram 104, and/or second volume hologram 106. Additionally or alternatively, additional stages of volume holograms 104, 106 may be provided, for example to steer in additional directions, to provide additional discrete steering before the continuous steering element 110, etc. In certain embodiments, one or more discrete steering elements 102, 104, 106 may be provided downstream of the continuous steering element 110.

Referencing FIGS. 2-4, example steering operations of a continuous steering element 110 are depicted. The example steering operations depicted in FIGS. 2-4 are example illustrative steering data, which is representative of continuous steering elements 110 according to the thin and/or bulk steering devices of the present disclosure. The steering capabilities depicted in FIGS. 2-4 cooperate with offset steering provided by other steering elements (e.g., 102, 104, 106) set forth herein. Example and non-limiting continuous steering elements 110 are capable to steer to an angle exceeding 20 degrees while maintaining >90% efficiency (e.g., 20 degrees at 92.3% efficiency in the example of FIG. 4). The depicted performance of FIGS. 2-4 is achievable at least by a thin beam steering device utilizing a half-wave voltage profile.

Figure 7:
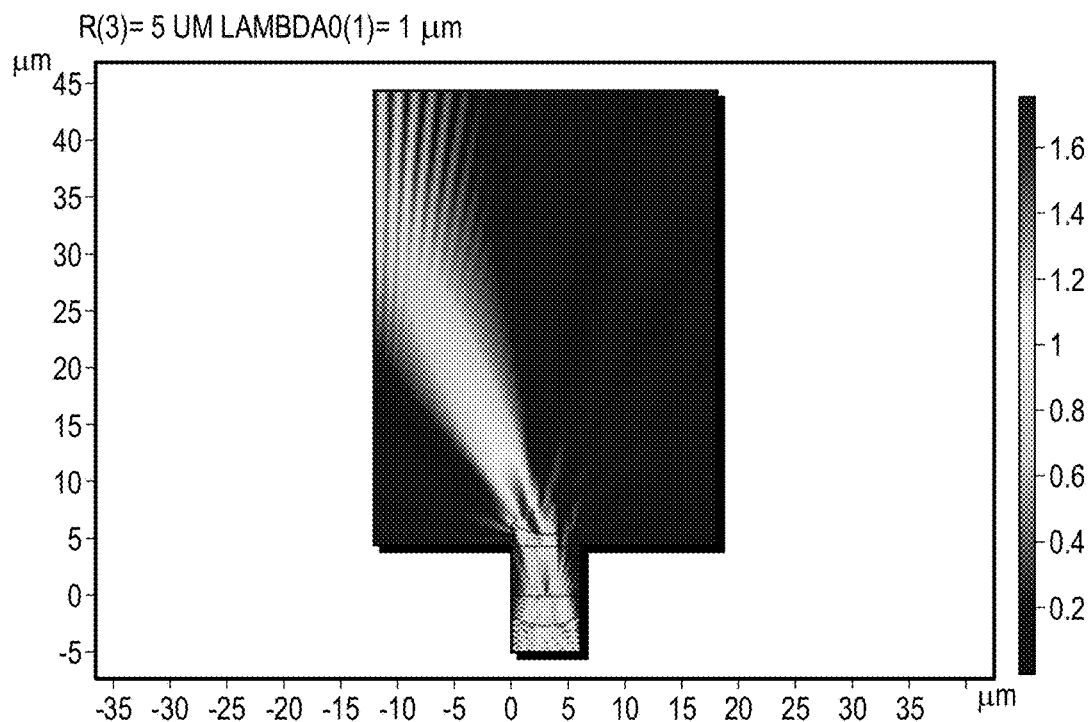
FIG. 7 is an illustrative depiction for steering capability of a continuous steering element associated with a fishtail booster.

Referencing FIG. 5, an example thin beam steering device 110 is depicted with an associated fishtail booster 502 (and/or meniscus lens). In certain embodiments, the fishtail booster 502 is provided with zero power—or the fishtail booster 502 preserves the convergence/divergence character of the incident beam 112. The incident beam 112 is depicted as normal to the thin beam steering device 110 for clarity of the present description, but it will be understood that the incident beam 112 may be steered at some angle. The fishtail booster 502 extends the steering capability of the thin beam steering device 110. For example, a thin beam steering device 110 according to embodiments of the present disclosure, such as a thin beam steering device 110 utilizing a half-wave voltage profile, can achieve steering of about 30 degrees (reference FIG. 7), at high efficiency. An example thin beam steering device 110 with an associated fishtail booster 502 can steer to about 20 degrees (device 110 capability), boosted to about 28.5 degrees without a loss of steering efficiency. In certain embodiments, the fishtail booster 502 can also modestly reduce cosine losses, for example decreasing the geometric angle between the emission surface and the steered light beam 114. The power (e.g., convergence/divergence characteristic) of the fishtail booster 502 can be manipulated using the thickness of the lens portions, the radius of curvature of the lens portions, and/or the index of refraction of the lens material for the meniscus lens. In certain embodiments, the front portion (e.g., on the incident beam 112 side), the rear portion (e.g., on the emitted beam 114 side), or both, may be implemented as a varifocal lens (VFL). The lens action may be provided with an integrated lens body (e.g., as depicted in FIG. 5), with lens portions provided on each side of the thin beam steering device 110, and/or utilizing a VFL. Any of these arrangements may be referenced as a fishtail booster and/or meniscus lens herein. An example thin beam steering device 110 with a fishtail booster 502 includes potassium tantalate niobite (KTN) as an active material (or EO material) for the thin beam steering device, and is capable of deflection (steering) of up to +/−15-25 degrees from the thin beam steering device, with up to +/−30 degrees utilizing the fishtail booster 502 portion for a steered beam having a wavelength of 1550 nm. It can be seen that a final steering capability of +/−30 degrees provides up to +/−60 degrees total steering for a system 100 with complete coverage, utilizing up to +/−30 degrees of pre-steering (whether discrete or continuous). In certain embodiments, for example where the incident beam 112 can be provided in a normal orientation to the thin beam steering device 110, coverage for the middle steering region can be performed by the thin beam steering device 110 steering unassisted, and the available steering range can be extended further. An example embodiment includes the thin beam steering device 110 (possibly with an associated fishtail booster) capable to steer to +/−30 degrees, with enhanced steering to each side of up to 30 degrees, providing for up to a full +/−90 degree steering coverage. Accordingly, embodiments of the present disclosure can provide full steering coverage with an arbitrary range limit of up to +/−90 degrees, which is the theoretical limit for a flat emission surface. It will be understood that cosine losses increase significantly at high steering angles, for example cosine losses are 50% at 60 degrees, and 100% at 90 degrees, so very high steering capability may be unnecessary for many applications. Embodiments herein are, therefore, capable to support any application where beam steering is desired from a flat emission surface, with the only limit being the cosine losses that remain acceptable for the given application.

Figure 6:
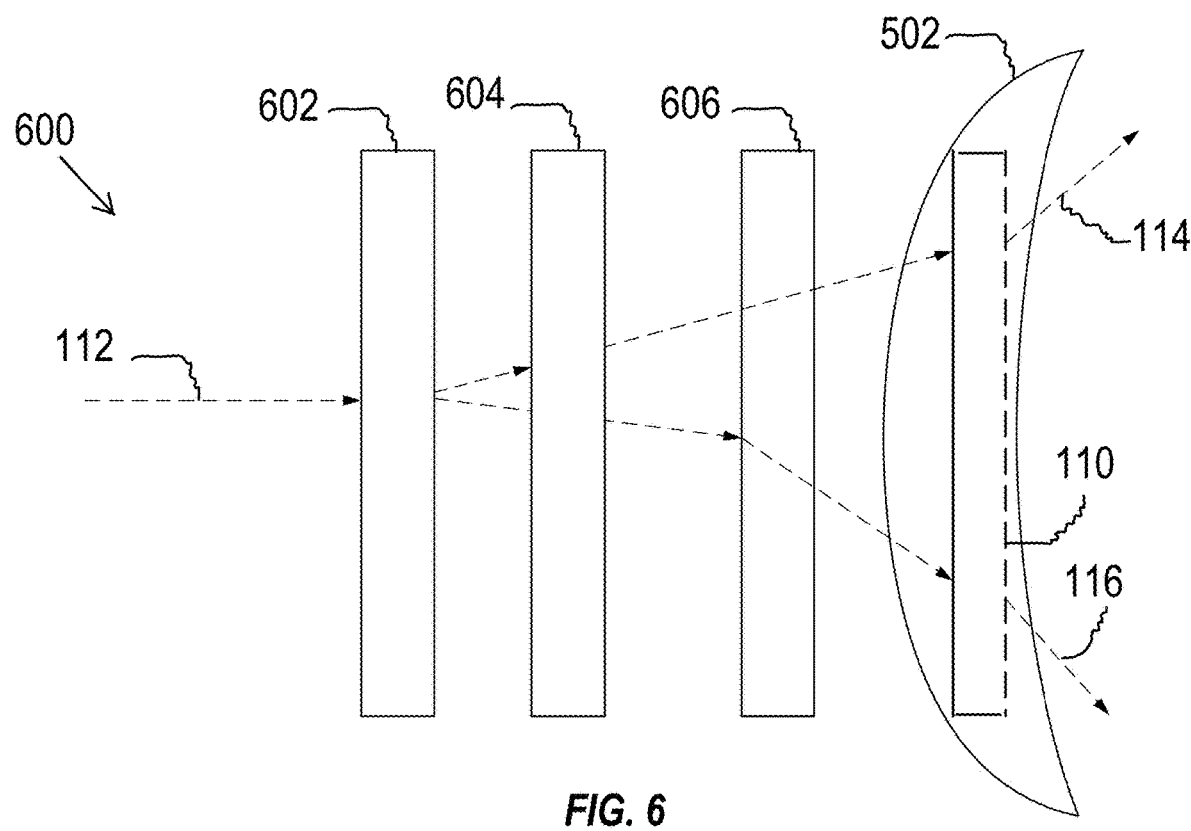
FIG. 6 is a schematic depiction of a system for steering an EM beam.

Referencing FIG. 6, an example beam steering system 600 includes a number of steering layers, and a thin beam steering device 110 with an associated fishtail booster 502. The example beam steering system 600 includes a first steering layer 602 that selectively steers an incident beam 112 in a first or second direction (e.g., the first direction steering to emitted beam 114, and the second direction steering to emitted beam 116). The first steering layer 602 may be a discrete steering element (e.g., a PBG) or a continuous steering element (e.g., a bulk steering device, thin steering device, etc.). The example beam steering system 600 includes a first volume hologram 604 responsive to a first incident angle to increase the steering angle further before progression to the thin beam steering device 110, and a second volume hologram 606 responsive to a second incident angle to increase the steering angle further before progression to the thin beam steering device 110. It will be seen that the volume holograms 606 may be utilized as discrete steering angle enhancers, to extend the steering range of the thin beam steering device 110. In certain embodiments, the incident beam 112 may be provided without steering from the first steering layer 602—for example where the native steering capability under current operating conditions is capable to steer to a steering target value. In certain embodiments, for example where the first steering layer 602 is a continuous steering element, the incident beam 112 may be steered to an angle that is not one of the coded angles for the volume holograms 604, 606, wherein the incident beam 112 will pass through the volume holograms 604, 606 without steering angle enhancement from the volume holograms 604, 606, for example to provide a minor steering enhancement from the first steering layer 602 to the thin beam steering device 110. The example of FIG. 6 includes an optional fishtail booster 502 depicted in an example configuration. The steering performed by the first steering layer 602 may be controlled by manipulation of the polarization of the incident beam 112, the control of phase delay progression in the first steering layer 602 (e.g., controlling a voltage profile of a steering device, which may be a thin beam steering device and/or a bulk beam steering device), or the like. In certain embodiments, the volume holograms 604, 606 may be omitted entirely, for example where the first steering layer 602 is capable to provide sufficient steering enhancement for the steering window of the application without the discrete enhancement provided by the volume hologram(s). The example of FIG. 6 depicts steering in a given axis, but may be adjusted, as set forth throughout the present disclosure, to also provide steering in a second axis. Where two axis steering is provided, and for embodiments throughout the present disclosure, the steering layers utilized for each steering axis may be distinct (e.g., a different set and/or sequence of steering elements for each), and/or the steering capability for each steering axis may be distinct.

An example thin film scanner (e.g., of a thin beam steering device 110) acts as a variable blazed grating. Generally, the relation between the incident angle and diffractive angle (e.g., the trace of 114/116 going into, and leaving, the thin beam steering device 110) can be approximated in Equation 1:

$$k_i \sin \theta_i \pm qK_i = k_d \sin \theta'_d$$

Eq. 1 Relationship between incident angle and diffractive angle for a thin film scanner In equation 1, $\theta_i$ is the incident angle and $\theta'_d$ is the deflection angle inside the grating, $k_i = n_i 2\pi/\lambda$ is the incident wavenumber, and $n_i$ is the index of the medium in the incident side. $n_i$ is considered to be approximately 1, because the light is assumed to enter from the air, but this parameter may be modified for other medium as will be understood to the person of skill in the art. $k_d$ is defined as $k_d = n_d 2\pi/\lambda$ which is the deflection wavenumber and $n_d$ is the index of the medium in the deflection side, q is the diffraction order. The $K_i$ is the grating wavenumber which is defined as in equation 2:

$$K_i = 2\pi/\Lambda$$

Eq. 2 Definition of the grating wavenumber

In equation 2, $\Lambda$ is the reset period.

In the case of a transmissive deflector, light will be refracted when it exits the grating material to air. According to Snell's law (equation 3):

$$n_d \sin \theta'_d = \sin \theta_d$$

Eq. 3 Snell's law, determining deflection angle based on index ratios (assumed 1 for air)

In equation 3, $\theta_d$ is the deflection angle in the air. Therefore, the grating formula for a transmissive grating will be approximated by equation 4:

$$\sin\theta_d = \sin\theta_i \pm q\frac{\lambda}{\Lambda}$$

Eq. 4 Grating formula for a transmissive grating

The formula in Eq. 4 shows that wider deflection angles may be achieved for non-normal incident lights if the incident angle is selected correctly. For a normal (perpendicular) incident, the deflection angle will be approximated by equation 5:

$$\theta_d = \pm\sin^{-1}\left(q\frac{\lambda}{\Lambda}\right)$$

Eq. 5 Deflection angle for a normal-incident EM beam

Note that, if $\sin \theta_d > 1$, that wave may not show up in the far-field. Therefore, for a given desired angle it has been found preferable that $$-1 < \sin\theta_i \pm q\frac{\lambda}{\Lambda} < 1.$$

In a case of perfect blazed grating, the maximum intensity will be for $q=\pm 1$. Therefore, for a normal incident, $\sin \theta_i = 0$, where the thin beam steering device approximates a perfect blazed grating, the deflection angle will be approximated by equation 6:

$$\theta_d = \pm\sin^{-1}\left(\frac{\lambda}{\Lambda}\right)$$

Eq. 6 Deflection angle estimate for a normal incident EM beam

For the largest design angle, the $\Lambda$ is preferably the minimum and vice versa. For example, if a thin film is designed to deflect a 1550 nm normally incident light to $\pm 20°$, the minimum reset period ($\Lambda$) will be approximately 4.5 µm.

In certain embodiments, the steering device is configured such that only the orders of $\pm 1$ are survived; otherwise, the diffractive efficiency will be significantly reduced because a significant fraction of light will be sent to other angles associated with the higher orders of diffraction where $|q \lambda/\Lambda| < 1$.

Generally, if $$\sin\theta_i = \pm\frac{\lambda}{\Lambda},$$

the final steering angle for $q=\pm 1$ can be estimated by equation 7:

$$\sin\theta_d = \sin\theta_i \pm q\frac{\lambda}{\Lambda} = \pm\frac{\lambda}{\Lambda} \pm \frac{\lambda}{\Lambda} = \pm 2\frac{\lambda}{\Lambda} \rightarrow -\sin^{-1}\left(2\frac{\lambda}{\Lambda}\right) < \theta_d < \sin^{-1}\left(2\frac{\lambda}{\Lambda}\right)$$

Eq. 7 Deflection angle with a non-perpendicular incident EM beam

For example, for $$\theta_i = -\sin^{-1}\left(\frac{\lambda}{\Lambda}\right),$$

the smallest angle will be approximately 0°, and the widest angle will be $$-\sin^{-1}\left(2\frac{\lambda}{\Lambda}\right).$$

For $$\theta_i = +\sin^{-1}\left(\frac{\lambda}{\Lambda}\right),$$

the smallest angle will be approximately 0°, and the widest angle will be $$+\sin^{-1}\left(2\frac{\lambda}{\Lambda}\right).$$

Therefore, by providing the incident angles of $$\theta_i = \pm\sin^{-1}\left(\frac{\lambda}{\Lambda}\right),$$

light can be steered up to $$\pm\sin^{-1}\left(2\frac{\lambda}{\Lambda}\right).$$

The parameter $$\pm \frac{\lambda}{\Lambda}$$

is the sine of the maximum angle which the thin film scanner (e.g., the thin beam steering device 110, and/or with an associated fishtail booster 502) is designed for in the case of a normal incident EM beam. Thus, except in atypical cases, $\Lambda$ may be the smallest reset period that the thin film scanner can offer. By using the halfwave voltage method equipped with the fishtail booster, a normally incident (sin $\theta_i$=0) light may be steered up to ±30°. If the intensity of the ±1 orders is maximized, then |sin $\theta_d$|=

$$|\sin\theta_d| = 0.5 = \frac{\lambda}{\Lambda} \rightarrow \frac{\lambda}{\Lambda} = 0.5.$$

The parameter $\Lambda$ is the smallest reset period available where the aspect ratio (e.g., thickness to length of active cells—see U.S. application Ser. No. 16/999,815 at FIG. 26 and the related description) is still 1. In an example, if sin $\theta_i$=±0.5, the light can be steered to approximately ±90°.

In the example, where q=±1, then $$\sin\theta_d = \sin\theta_i \pm q\frac{\lambda}{\Lambda} = \sin\theta_i \pm \frac{\lambda}{\Lambda} = \pm 0.5 + \pm 0.5 = \pm 1 \rightarrow -90° < \theta_d < 90°.$$

An example beam steering system utilizes a thin beam steering device 110, such as a half-wave voltage based device, without an associated fishtail booster. The example system can readily be configured for the thin beam steering device 110 portion to have unassisted efficient steering capability to ±20°. Accordingly, for such a system:

$$|\sin\theta_d| = |\sin 20| = 0.342 = \frac{\lambda}{\Lambda} \rightarrow \frac{\lambda}{\Lambda} = 0.342,$$

and it follows that the final enhanced steering capability is approximately ±43° (e.g., where q=±1, then $\sin\theta_d =$ $$\sin\theta_i \pm q\frac{\lambda}{\Lambda} = \sin\theta_i \pm \frac{\lambda}{\Lambda} = \pm 0.342 + \pm 0.342 = \pm 0.684 \rightarrow -43° < \theta_d < 43°\Big).$$

Thus, providing enhanced steering utilizing incident angle adjustments as set forth herein, the steering capability generated for incident angle of $$\theta_i = -\sin^{-1}\left(\frac{\lambda}{\Lambda}\right) \text{ and } \theta_i = +\sin^{-1}\left(\frac{\lambda}{\Lambda}\right)$$

may steer to $$\pm \sin^{-1}\left(2\frac{\lambda}{\Lambda}\right),$$

with a thin film scanner designed for steering the normal incident light to $$\pm \sin^{-1}\left(\frac{\lambda}{\Lambda}\right).$$

An example beam steering system capable to steer to +60° is described following, and is not limiting to any other aspect of the present disclosure. The example beam steering system is consistent with the example depicted in FIG. 1. The example beam steering device includes a thin beam steering device designed for steering the normal incident light up to ±25.6°, a PBG, and two volume holograms interposed between the PBG and the thin beam steering device. In the example, the volume holograms are configured, in coordination with the PBG, to provide a normal incident beam onto the PBG as an incident beam onto the thin beam steering device at either +25.6° or −25.6°. For example, the PBG may be configured to provide a first or second angle to the incident beam, such as in response to a polarization of the incident beam, where the first angle matches a selected angle that a first volume hologram is responsive to, and where the second angle matches a selected angle that the second volume hologram is responsive to. In certain embodiments, the PBG in the example may be replaced with a different type of steering element, such as a continuous steering element that is controllable to provide the selected angle(s) for the volume holograms. In the example, the PBG (or other leading steering element) steers the incident beam to the selected angle(s), a first volume hologram steers the light to $$+\sin^{-1}\left(\frac{\lambda}{\Lambda}\right),$$

the second volume hologram steers the light to $$-\sin^{-1}\left(\frac{\lambda}{\Lambda}\right),$$

the thin beam steering device is designed to steer a normal incident beam to $$+/-\sin^{-1}\left(\frac{\lambda}{\Lambda}\right),$$

and the overall steering capability of the beam steering system is $$+/-\sin^{-1}\left(2\frac{\lambda}{\Lambda}\right).$$

Figure 8:
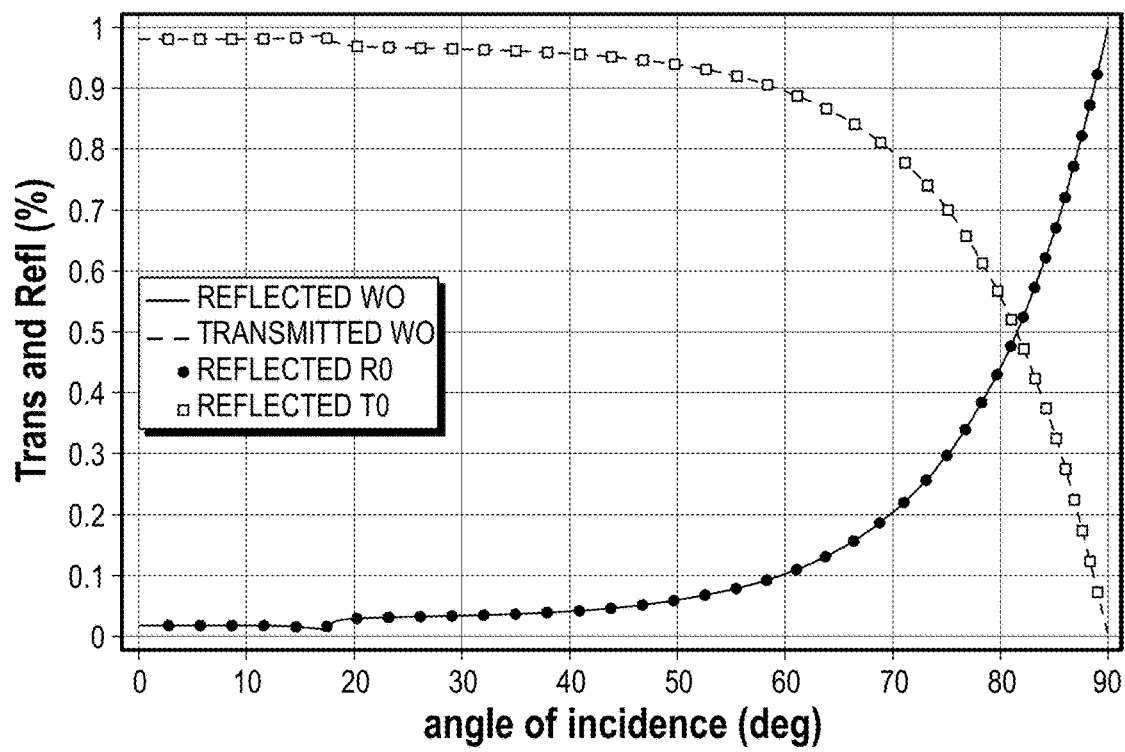
FIG. 8 depicts illustrative data for reflective losses at high steering angles.

As described herein, embodiments of the present disclosure include steering of an incident EM beam, where the EM beam incidence to a final steering layer (e.g., a thin beam steering device) is not a normal incidence angle during at least certain operating conditions. Accordingly, in certain embodiments, consideration in the arrangement of a beam steering system to first order reflection due to high incidence angles may be considered, and may be considered as a loss in steering efficiency. Referencing FIG. 8, an illustrative operating diagram for a given beam steering device. It can be seen in the example of FIG. 8 that low, and typically insignificant, reflection occurs up to about $\theta_i$ 18 degrees. In the example of FIG. 8, an incidence angle of even 30 degrees, sufficient to support many arrangements that can provide +/−60 degree steering, results in about 5% reflection loss. In many applications, a 5% reflection loss may be readily acceptable given the capability of a +/−60 degree, diffraction-efficient, beam steering device of the present disclosure, relative to the steering efficiency and capability of previously known devices. The example of FIG. 8 is determined for a typical scanner material and EM beam profile (e.g., wavelength, intensity, etc.). The type of data depicted in FIG. 8 is readily available to one of skill in the art, having the benefit of the present disclosure, and information ordinarily available when contemplating a particular system, such as scanner materials, EM beam characteristics, surface conditions (e.g., availability and/or utilization of anti-reflective coatings, surface characteristics, etc.). It can be seen that reflection losses for the illustrative data in FIG. 8 do not reach 10% until $\theta_i$ is about 60 degrees. The present disclosure is not limiting to particular Oi values, including values exceeding 60 degrees, but it is noted that a given beam steering device can be arbitrarily capable (e.g., steering up to +/−90 degrees) with a Oi value significantly lower than 60 degrees. Accordingly, the present disclosure sets forth beam steering systems that can steer to arbitrary capability with steering efficiencies that remain high for a broad range of applications. In certain embodiments, losses for reflection occurring at high values of Oi may nevertheless be acceptable, for example where the high value of Oi provides benefits for a given system that exceed the reflection loss for a contemplated application, such as reduced capability requirements for a thin beam steering device 110, elimination of other components (e.g., a fishtail booster 502), transfer of some steering duty to a high efficiency component (e.g., a volumetric hologram), manipulation of heat generation and/or expulsion between selected locations and/or components within the beam steering device, or the like.

A few design considerations for a volume hologram are described following, which are illustrative and not limiting. An example volume hologram steers the incident EM beam to an angle such as $$-\sin^{-1}\left(\frac{\lambda}{\Lambda}\right) \text{ or } +\sin^{-1}\left(\frac{\lambda}{\Lambda}\right).$$

The example volume hologram acts like a diffraction grating having a thickness, and is made of a recording medium (e.g., photo-thermal glass) extending between planes of z=0 (e.g., one side of the volume hologram active medium) and z=Δ(e.g., the opposing side of the volume hologram active medium). Equation 8 sets forth the interference pattern of the volume hologram in x, y, and z coordinates:

$$I(x,y,z)=|\sqrt{I_r}e^{-ik_r\cdot r}+\sqrt{I_o}e^{-ik_o\cdot r}|^2 = I_r+I_o+2\sqrt{I_rI_o}\cos(k_g\cdot r)$$

Eq. 8 Interference pattern of an example volume hologram

In the example of equation 8, $I_r$ and $I_o$ are the intensities of the reference and object beams and $k_r$ and $k_o$ are the object and reference wavevector, respectively. In the example, the grating vector $k_g=k_o-k_r$, and the sinusoidal pattern of the period is $L=2\pi/|k_g|$. If the angle between the reference wave points and the object wave is Θ, the grating period is $|k_g|=2k \sin \theta/2$ and the period will be approximately $$L = \frac{\lambda}{2\sin\Theta/2}.$$

In the example, parallel plates are recorded and form a thick diffraction grating which is called the volume hologram. When the volume hologram is illuminated with a wave, the parallel planes of the grating reflect the wave only when the Bragg condition of sin $$\varphi = \frac{\lambda}{2L}$$

is satisfied; otherwise, the light will be transmitted.

The angle of φ is the angle between the planes of grating and the incident reference wave, which is approximately half of the angle between the reference and object waves. For an example volume hologram providing an incident angle of $$\theta_i = -\sin^{-1}\left(\frac{\lambda}{\Lambda}\right),$$

and a second example volume hologram to provide $$\theta_i = +\sin^{-1}\left(\frac{\lambda}{\Lambda}\right),$$

then the angle between the incident light and the parallel planes of the grating in the first and second volume hologram is preferably $$\varphi = -0.5\sin^{-1}\left(\frac{\lambda}{\Lambda}\right) \text{ and } \varphi = 0.5\sin^{-1}\left(\frac{\lambda}{\Lambda}\right),$$

respectively, to satisfy the Bragg condition.

Table 1 summarizes example arrangements to steer light to selected wide angles as described.

TABLE 1

Example arrangements of a beam steering system to steer to selected angles

| Type of scanner | Steering to $\pm\sin^{-1}\left(2\frac{\lambda}{\Lambda}\right)$ Any applicable type | Steering to ±90° Chess scanner or Half wave voltage with fishtail booster | Steering to ±60° Half wave voltage scanner with fishtail booster | Steering to ±43° Half wave voltage scanner |
|---|---|---|---|---|
| The maximum deflection angle of the scanner for normal incident | $\pm\sin^{-1}\left(\frac{\lambda}{\Lambda}\right)$ | ±30° | ±25.6° | ±20° |

TABLE 1-continued

Example arrangements of a beam steering system to steer to selected angles

| Type of scanner | Steering to $\pm\sin^{-1}\left(2\frac{\lambda}{\Lambda}\right)$ Any applicable type | Steering to $\pm 90°$ Chess scanner or Half wave voltage with fishtail booster | Steering to $\pm 60°$ Half wave voltage scanner with fishtail booster | Steering to $\pm 43°$ Half wave voltage scanner |
|---|---|---|---|---|
| The Bragg condition of the volume hologram | $\sin\left(0.5\sin^{-1}\left(\frac{\lambda}{\Lambda}\right)\right) = \frac{\lambda}{2L}$ | $\sin(15) = 0.2588 = \frac{\lambda}{2L}$ | $0.22 = \frac{\lambda}{2L}$ | $0.173 = \frac{\lambda}{2L}$ |
| VH1's outlet angle | $+\sin^{-1}\left(\frac{\lambda}{\Lambda}\right)$ | 30° | 25.6° | 20° |
| The angle between the grating and coming wave in VH1 | $0.5\sin^{-1}\left(\frac{\lambda}{\Lambda}\right)\lambda$ | 15° | 12.8° | 10° |
| VH2's outlet angle | $-\sin^{-1}\left(\frac{\lambda}{\Lambda}\right)$ | −30° | −25.6° | −20° |
| The angle between the grating and comingwave in VH2 | $-0.5\sin^{-1}\left(\frac{\lambda}{\Lambda}\right)$ | −15° | −12.8° | −10° |

Figure 14:
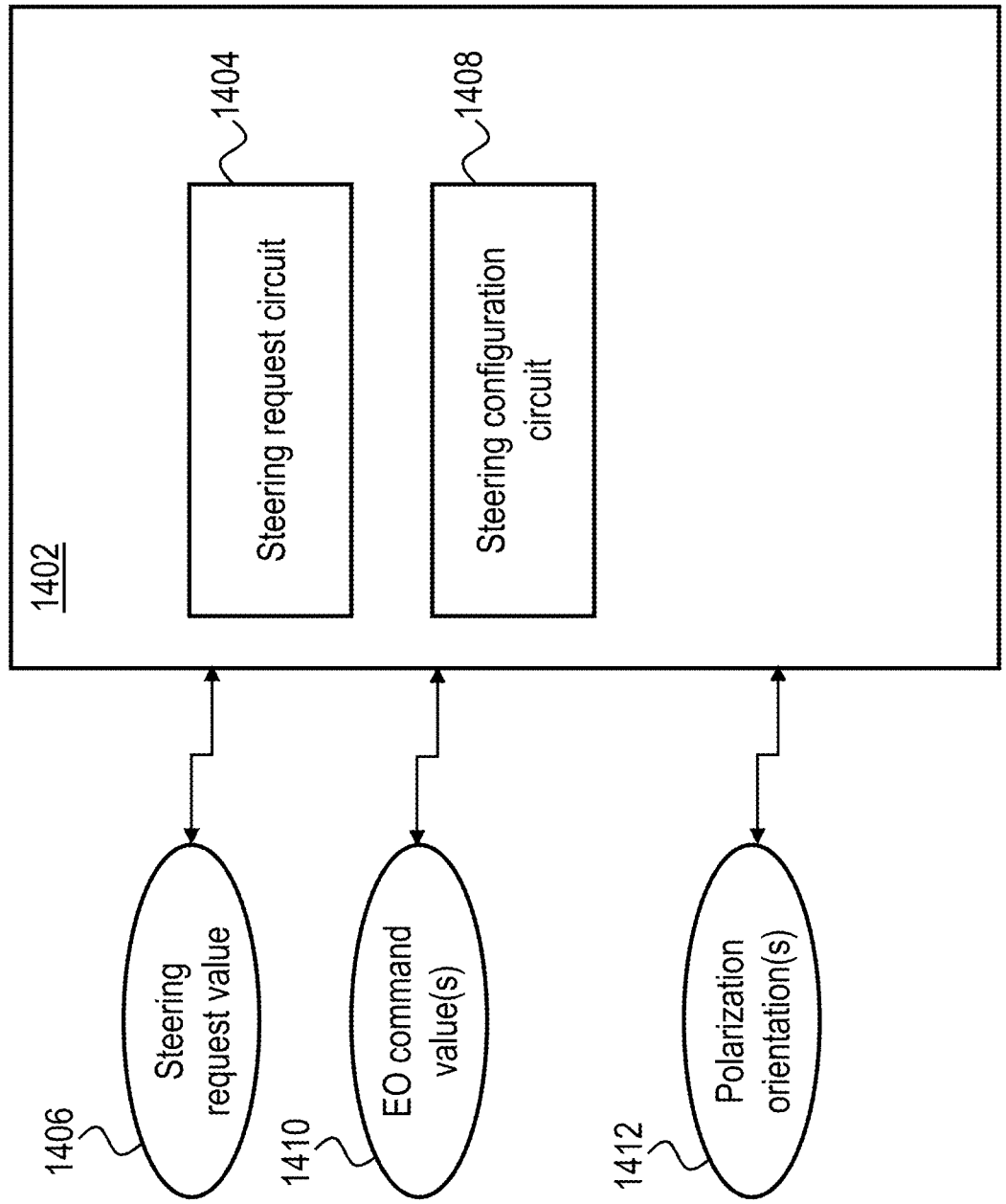
FIG. 14 is a schematic block diagram of a controller for steering an EM beam.

Referencing FIG. 14, an example steering controller 1402 structured to perform certain operations for steering an EM beam, whether transmitted or received, is schematically depicted. The steering controller 1402 is depicted as a single device for clarity of description, although aspects of the steering controller 1402 may be distributed across multiple devices, implemented in hardware and/or as instructions stored on a computer readable medium, as sensors and/or actuators present in a system including the steering controller 1402, and/or through network communications and/or remote processing capabilities.

An example steering controller 1402 includes a number of circuits structured to functionally execute certain operations of the steering controller 1402. Certain operations are described in reference to FIG. 14, but any operations, procedures, or techniques throughout the present disclosure may be implemented by, or performed by, a controller such as steering controller 1402. The example steering controller 1402 may form a part of any systems, apparatuses, devices, or other embodiments disclosed throughout the present disclosure. Without limitation to any other aspect of the present disclosure, a steering controller 1402 including one or more aspects such as those described in reference to FIG. 14 may be present in a system having one or more controllable devices such as, without limitation, a continuous steering element (e.g., a thin beam steering device and/or a bulk beam steering device), a PBG (e.g., combined with an EM source capable to provide selectable polarization), and/or a volume hologram (e.g., controlling an upstream device providing an incident beam to the volume hologram at a selected incident angle, including an angle selected to activate and/or bypass active steering of the volume hologram).

An example steering controller 1402 includes a steering request circuit 1404 that interprets a steering request value 1406 (e.g., directing a transmitted beam to a selected location, and/or at a selected angle or angles; and/or directing received EM radiation from a selected location, and/or at a selected angle or angles, to an EM receiving device such as a detector array, sensor, photonic array, optical device, etc.). The example steering controller 1402 further includes a steering configuration circuit 1408 that determines a number of electro-optical command values 1410 (e.g., values for an active layer of thin beam steering device, and/or for electrodes of a bulk steering device, thereby configuring steering operations of the steering device, a phase delay progression, and/or compensating optical characteristics to account for an incident angle Oi of EM radiation on the steering device, where the EM radiation is to be steered). An example system including the steering controller 1402 includes a continuous steering element (e.g., a thin beam steering device and/or a bulk steering device) that is responsive to the number of EO command values 1410 to provide selected steering operations (e.g., utilizing a corresponding phase delay progression across the continuous steering element). An example steering controller 1402 further includes where the steering configuration circuit 1408 determines a polarization orientation 1412 (e.g., providing an EM source for the incident beam that will steer from a PBG in a selected direction) in response to the steering request value 1406 (e.g., utilizing steering regimes associated with steering targets, etc.). An example system including the steering controller 1402 includes a selectively polarized electromagnetic source (not shown) that provides the incident beam to the PBG at a selected one of a first polarization corresponding to the first angle, or a second polarization corresponding to the second angle, and where the selectively polarized electromagnetic source is responsive to the polarization orientation 1412.

Figure 9:
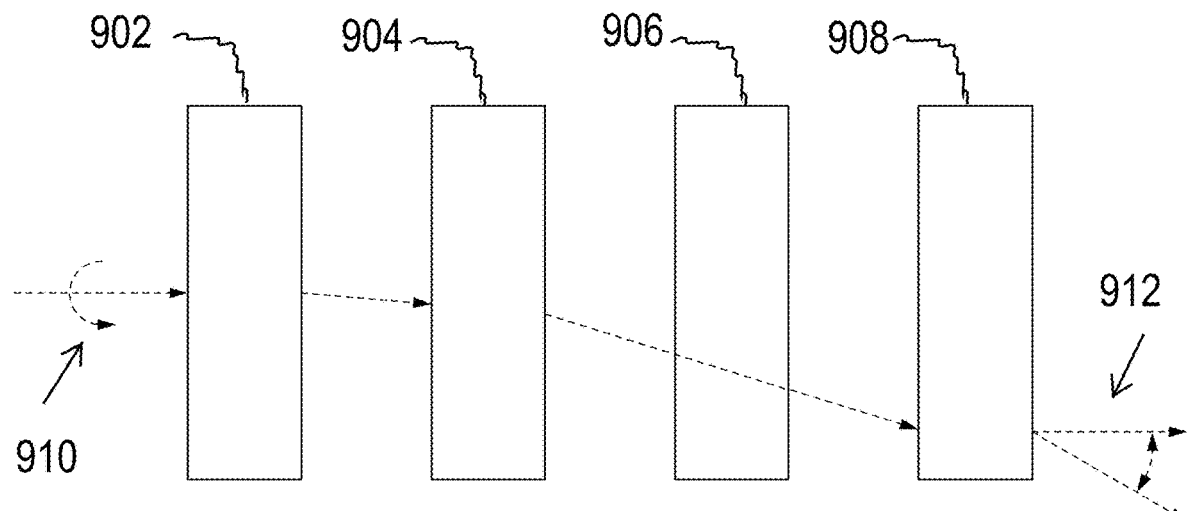
FIG. 9 is a schematic depiction of a system for steering an EM beam.

Referencing FIG. 9, an example beam steering system is depicted to illustrate certain aspects of the present disclosure. The schematic depiction of FIG. 9 is an illustrative, and non-limiting, example system. The beam steering system includes an incident EM beam 910 having selective circular polarization from an EM source (not shown) capable to provide selective polarization to the EM beam 910. The example incident EM beam 910 is depicted with a right-hand polarization (relative to the EM source), although the specific polarization direction and/or technique (e.g., some devices can steer responsive to a linear polarization, such as a sawtooth profile phase grating) is not limiting. The example system includes a PBG 904 that provides a selected discrete steering angle to the beam 910. The PBG 904, in the example, is selected to provide either one of a specific angle relevant to a first volume hologram 904, or a second specific angle relevant to a second volume hologram 906. In the example of FIG. 9, the specific angle from the PBG 904 is a specific angle relevant to the first volume hologram 904, which enhances the steering angle of the beam 910. In the example of FIG. 9, the second volume hologram 906 transmits the beam 910, which impinges on a final steering device 908 at a non-normal angle as depicted. The example final steering device 908, which may be a continuous steering element (e.g., a thin beam steering device, bulk beam steering device, and/or a beam steering device associated with a fishtail booster) provides a final steered beam 912, which is depicted schematically showing a range of available steering angles. The range of available steering angles is illustrative and non-limiting.

Figure 10:
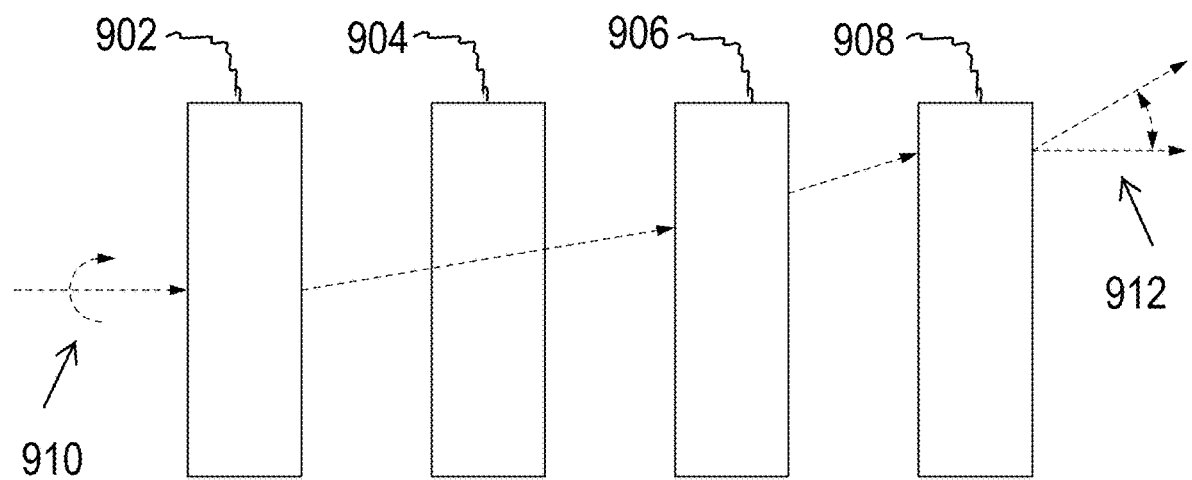
FIG. 10 is a schematic depiction of a system for steering an EM beam.

Referencing FIG. 10, an example beam steering system is depicted, which is consistent with aspects of the system of FIG. 9. In the example of FIG. 10, the incident beam 910 is polarized in the opposite direction (e.g., left-hand polarization), and steered to the second specific angle by the PBG 902, which is transmitted by the first volume hologram 904. In the example of FIG. 10, the second specific angle is a specific angle relevant to the second volume hologram 906, and the steering angle is increased before impingement on the final steering device 908. In the example of FIG. 10, the steering capability of the final steering device 908 is adjusted relative to the example of FIG. 9, due to the change in the incident angle of impingement of the beam 910 on the final steering device 908. The steering capabilities of the configuration in FIG. 9 and FIG. 10 can, in certain embodiments, be determined and provided, for example in determining selected specific angles, the activity of the volume hologram(s), and/or the type and capability of the final steering device, to ensure that the overlapping capabilities provide a sufficient steering window (e.g., +/−range of steering capability, and/or efficiency values) for a given application.

Figure 15:
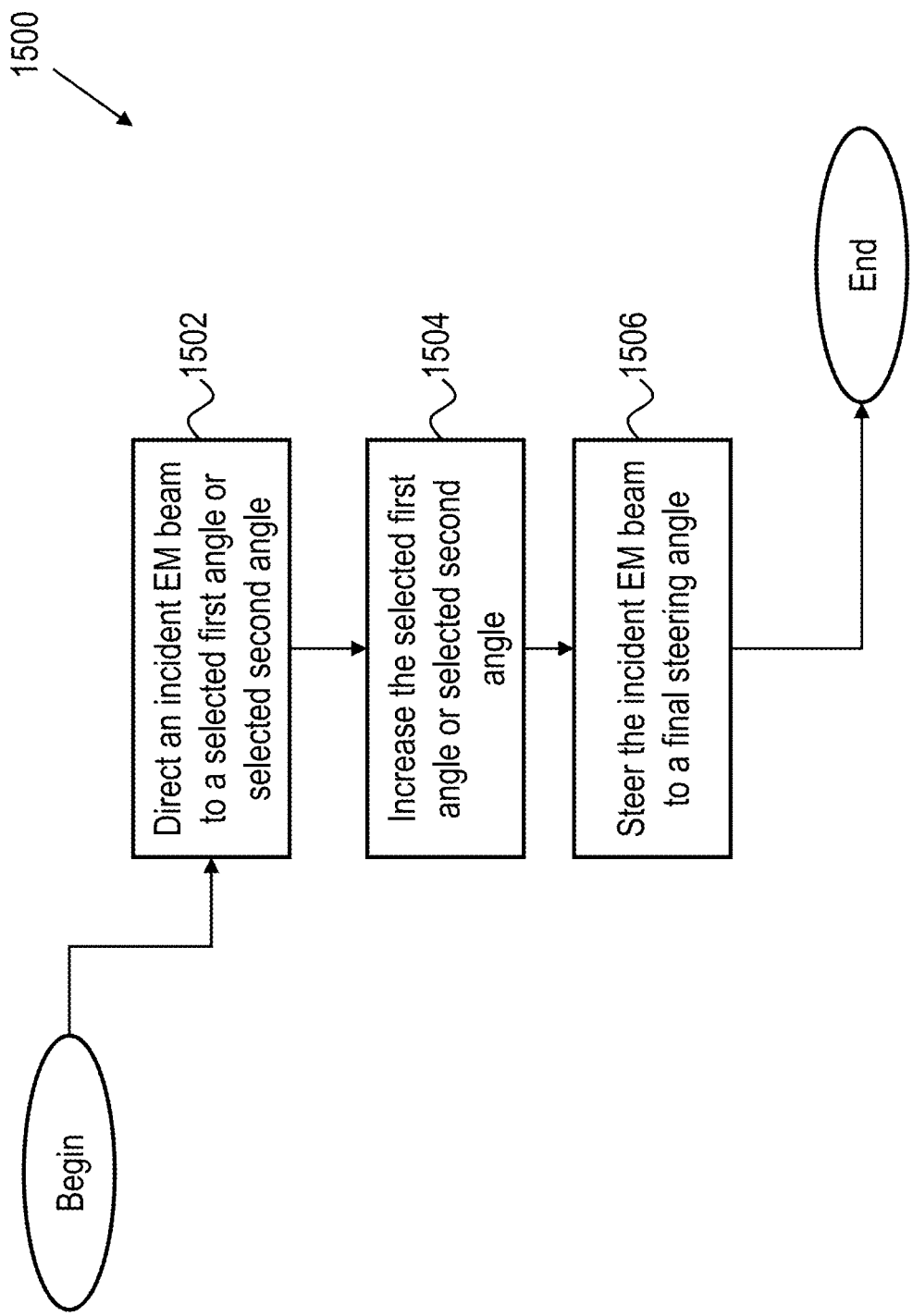
FIG. 15 is a schematic flow diagram of a procedure for steering an EM beam.

Referencing FIG. 15, an example procedure 1500 for steering an EM beam to a wide angle (e.g., >+/−30 degrees, >+/−45 degrees, up to +/−60 degrees, and/or to an arbitrary angle up to +/−90 degrees, and/or sufficiently away from 90 degrees that, depending upon the application, cosine losses for the steered beam are within acceptable parameters) is schematically depicted. The example procedure 1500 includes an operation 1502 to direct an incident electromagnetic (EM) beam to a selected one of a first selected angle or a second selected angle (e.g., utilizing a continuous steering element, and/or a PBG responsive to a polarization of the incident EM beam), and an operation 1504 to increase the selected one of the first selected angle or the second selected angle with a volume hologram responsive to the selected one of the first selected angle or the second selected angle. The example procedure 1500 further includes an operation 1506 to steer the incident EM beam to a final steering angle with a continuous steering element (e.g., a thin beam steering device and/or a bulk beam steering device.

Figure 16:
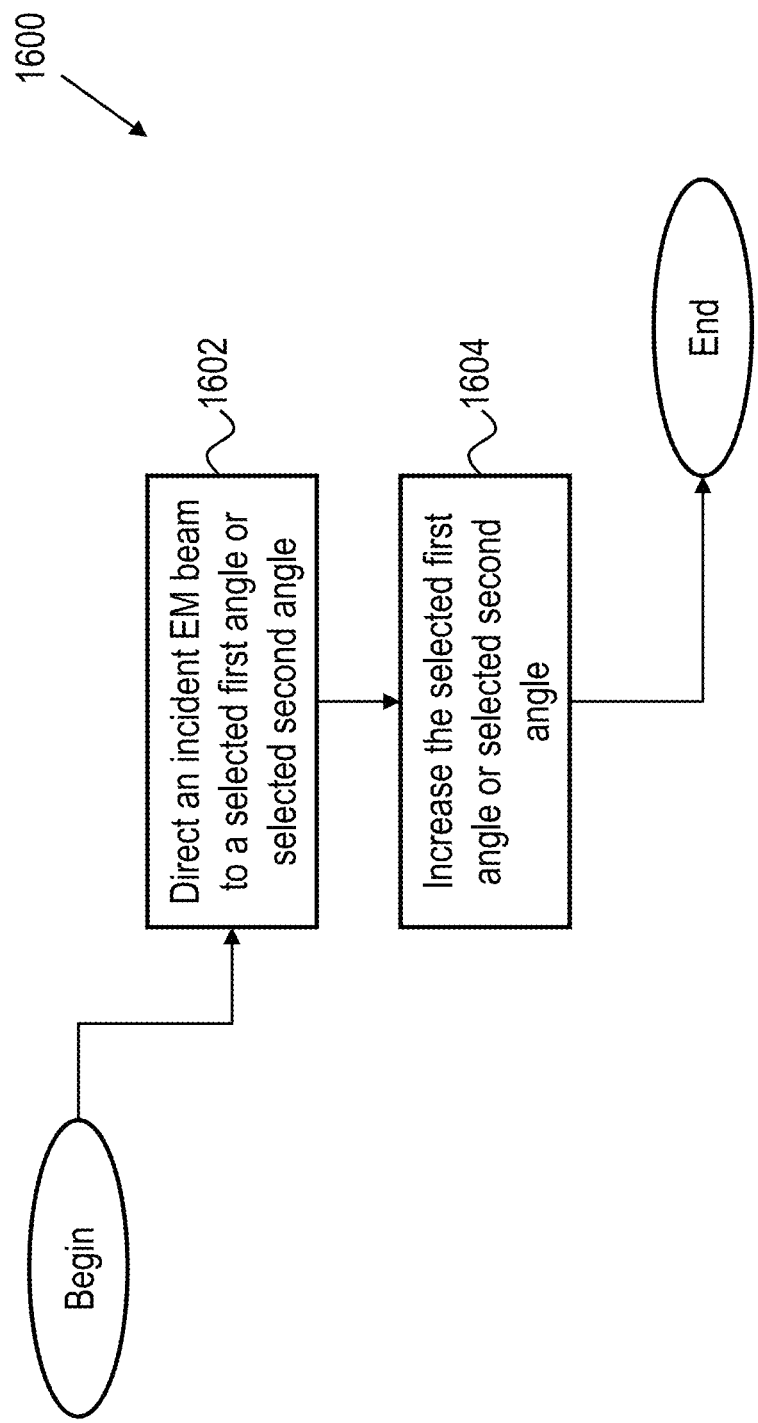
FIG. 16 is a schematic flow diagram of a procedure for steering an EM beam.

Referencing FIG. 16, an example procedure 1600 for steering an EM beam to a wide angle is schematically depicted. The example procedure 1600 includes an operation 1602 to adjust an incident angle, of an EM beam to be steered, impinging on a final steering device (e.g., a continuous steering element, thin beam steering device, and/or bulk beam steering device). Example operations 1602 include one or more of, without limitation: adjusting an emission angle of a PBG (e.g., PBG emitting to a volume hologram, and/or directly to the final steering device); adjusting an emission angle of an initial steering device (e.g., a continuous steering element, thin beam steering device, and/or bulk beam steering device, where the initial steering device emits to a volume hologram and/or directly to the final steering device); and/or enhancing an angle of an intermediate beam to form the beam impinging on the final steering device (e.g., utilizing a volume hologram to increase a steered angle of the intermediate beam before impingement on the final steering device). The example procedure 1600 further includes an operation 1604 to operate the final steering device to steer the EM beam according to a steering target value (e.g., commanding a continuous steering element, such as a thin beam steering device, bulk beam steering device, and/or a steering device associated with a fishtail booster).

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions, and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM, and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A system, comprising:
an electromagnetic (EM) source;
a first volume hologram;
a polarization birefringence grating (PBG);
a second volume hologram; and
a continuous steering element comprising a thin beam steering device that includes a solid electro-optical (EO) crystal layer,
wherein the PBG is interposed between the EM source and the first volume hologram,
wherein the first volume hologram is interposed between the PBG and the second volume hologram,
wherein the second volume hologram is interposed between the first volume hologram and the continuous steering element,
wherein the PBG is responsive to a polarization of an incident beam from the EM source to selectively steer the incident beam to one of a first selected angle or a second selected angle,
wherein the first volume hologram is responsive to the first selected angle of the incident beam to increase a steered angle of the incident beam in a direction of the first selected angle, and
wherein the second volume hologram is responsive to the second selected angle of the incident beam to increase the steered angle in a direction of the second selected angle.

2. The system of claim 1, wherein the thin beam steering device comprises a modulo $2\pi n$ steering device.

3. The system of claim 1, further comprising a fishtail booster associated with the thin beam steering device.

4. The system of claim 1, further comprising a steering controller, comprising:
a steering request circuit structured to interpret a steering request value; and
a steering configuration circuit structured to determine a plurality of electro-optical (EO) command values in response to the steering request value,
wherein the thin beam steering device is responsive to the plurality of EO command values to provide a corresponding phase delay progression across the thin beam steering device.

5. The system of claim 4, wherein:
the steering configuration circuit is further structured to determine a polarization orientation in response to the steering request value;
the system further comprises a selectively polarized electromagnetic source structured to provide the incident beam to the PBG at a selected one of a first polarization corresponding to the first angle, or a second polarization corresponding to the second angle; and
the selectively polarized electromagnetic source is responsive to the polarization orientation.

6. The system of claim 2, wherein the modulo $2\pi n$ steering device comprises at least one of: a chess scanner arrangement or a castle scanner arrangement.

7. The system of claim 2, wherein the modulo $2\pi n$ steering device utilizes a half-wave voltage profile.

8. The system of claim 1, wherein the thin beam steering device comprises a steering capability of at least one of: at least 15 degrees or less than 25 degrees.

9. The system of claim 1, wherein the PBG, the first volume hologram, the second volume hologram, and the continuous steering element are sequential layers along a same axis.

* * * * *